United States Patent
Suzuki

(10) Patent No.: US 9,509,680 B2
(45) Date of Patent: Nov. 29, 2016

(54) INFORMATION PROCESSING SYSTEM, INFORMATION PROCESSING METHOD AND COMMUNICATION DEVICE

(71) Applicant: FUJITSU LIMITED, Kawasaki-shi, Kanagawa (JP)

(72) Inventor: Kazuhiro Suzuki, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 22 days.

(21) Appl. No.: 14/574,821

(22) Filed: Dec. 18, 2014

(65) Prior Publication Data

US 2015/0106901 A1   Apr. 16, 2015

Related U.S. Application Data

(63) Continuation of application No. PCT/JP2012/065905, filed on Jun. 21, 2012.

(51) Int. Cl.
| | |
|---|---|
| H04L 29/06 | (2006.01) |
| G06F 21/33 | (2013.01) |
| H04L 29/08 | (2006.01) |

(52) U.S. Cl.
CPC ........... H04L 63/0823 (2013.01); G06F 21/33 (2013.01); H04L 67/141 (2013.01); G06F 2221/2115 (2013.01)

(58) Field of Classification Search
CPC ................................ G06F 21/33; G06F 21/53
See application file for complete search history.

(56) References Cited

U.S. PATENT DOCUMENTS 6,035,402 A * 3/2000 Vaeth ...................... H04L 9/321
713/158
7,913,080 B2 * 3/2011 Taniguchi ........... H04L 63/0272
380/229
8,549,300 B1 * 10/2013 Kumar .................. H04L 9/3247
713/153

(Continued)

FOREIGN PATENT DOCUMENTS

| | | |
|---|---|---|
| JP | 2001-326696 | 11/2001 |
| JP | 2002-117230 | 4/2002 |

(Continued)

OTHER PUBLICATIONS

International Search Report of PCT/JP2012/065905 mailed Jul. 31, 2012.

(Continued)

*Primary Examiner* — Shawnchoy Rahman
(74) *Attorney, Agent, or Firm* — Staas & Halsey LLP

(57) ABSTRACT

Provided is a state with which each user is able to use information processing service of each user. A router (2) receives, from a terminal device, authentication information which authenticates a user of a cloud service, and executes a user authentication request upon an authentication server device (3). If the authentication server device (3) successfully authenticates the user, the authentication server device (3) transmits a first information and a second information which are defined for each user of the cloud service, the router (2) receives the first information and the second information. On the basis of the received first information, the router (2) transmits to a data center (DC_1) a first command which instructs a start of software, and, on the basis of the received second information, the router (2) establishes a tunnel to a communication network (Nt).

14 Claims, 25 Drawing Sheets

(56) References Cited

U.S. PATENT DOCUMENTS

| | | | | |
|---|---|---|---|---|
| 2002/0144144 | A1* | 10/2002 | Weiss | H04L 9/321 726/15 |
| 2004/0093492 | A1* | 5/2004 | Daude | H04L 63/0227 713/156 |
| 2004/0224771 | A1* | 11/2004 | Chen | A63F 13/12 463/42 |
| 2006/0041761 | A1* | 2/2006 | Neumann | G06F 21/32 713/189 |
| 2010/0325406 | A1 | 12/2010 | Ukeda et al. | |
| 2011/0264910 | A1 | 10/2011 | Masuda | |
| 2011/0292942 | A1 | 12/2011 | Imai | |
| 2011/0307696 | A1 | 12/2011 | Masuda | |
| 2012/0005477 | A1* | 1/2012 | Wei | H04L 63/0272 713/153 |
| 2012/0096271 | A1* | 4/2012 | Ramarathinam | H04L 63/0807 713/172 |

FOREIGN PATENT DOCUMENTS

| | | |
|---|---|---|
| JP | 2010-97567 | 4/2010 |
| JP | 2011-2975 | 1/2011 |
| JP | 2011-76506 | 4/2011 |
| JP | 2011-232794 | 11/2011 |
| JP | 2011-250209 | 12/2011 |
| JP | 2012-68826 | 4/2012 |

OTHER PUBLICATIONS

Extended European Search Report dated May 11, 2015 in corresponding European Patent Application No. 12879178.7.

Sundararaj et al., "Towards Virtual Networks for Virtual Machine Grid Computing", Proceedings of the Third Virtual Machine Research and Technology Symposium, USENIX Association, San Jose, CA, USA, May 6-7, 2004, 15 pp.

* cited by examiner

| USER ID | START/STOP INFORMATION OF VIRTUAL ROUTER | IP ADDRESS OF VIRTUAL ROUTER | L2 PROTOCOL | SaaS ID |
|---|---|---|---|---|
| User-A | API_VR-A | x1.x2.x3.x4 | GRE | SaaS-0 |
| User-B | API_VR-B | y1.y2.y3.y4 | OpenVPN | SaaS-1 |
| User-C | API_VR-C | z1.z2.z3.z4 | L2TP | SaaS-0 |

| SaaS ID | START/STOP INFORMATION OF VIRTUAL MACHINE | IP ADDRESS OF VIRTUAL MACHINE | USING PROTOCOL |
|---|---|---|---|
| SaaS-0 | API_VM-A | xx1.xx2.xx3.xx4 | HTTP |
| SaaS-1 | API_VM-B | yy1.yy2.yy3.yy4 | SMB |

| USER ID | CPU (GHz) | MEMORY (Gbyte) | STORAGE APPARATUS (Gbyte) | COMMUNICATION BAND (Gbps) |
|---|---|---|---|---|
| User-A | 1.0 | 1.0 | 100.0 | 1.2 |
| User-B | 1.5 | 1.5 | 200.0 | 1.5 |
| User-C | 1.0 | 1.2 | 250.0 | 1.2 |

T11

| SaaS ID | CPU (GHz) | MEMORY (Gbyte) | STORAGE APPARATUS (Gbyte) | COMMUNICATION BAND (Gbps) | SOFTWARE |
|---|---|---|---|---|---|
| SaaS-0 | 2.0 | 2.0 | 100.0 | 1.0 | OS0,App0a,App0b |
| SaaS-1 | 3.5 | 2.5 | 200.0 | 1.2 | OS1,App1b,App1b |

| SaaS ID | START/STOP INFORMATION OF VIRTUAL MACHINE | IP ADDRESS OF VIRTUAL MACHINE | USING PROTOCOL | SaaS STATUS | NUMBER OF USER | INITIAL USER ID |
|---|---|---|---|---|---|---|
| SaaS-0 | API_VM-A | xx1.xx2.xx3.xx4 | HTTP | START | Count-0 | User-A |
| SaaS-1 | API_VM-B | yy1.yy2.yy3.yy4 | SMB | STOP | Count-1 | |

T31

INFORMATION PROCESSING SYSTEM, INFORMATION PROCESSING METHOD AND COMMUNICATION DEVICE

CROSS-REFERENCE TO RELATED APPLICATION

This application is a continuation application of International Application PCT/JP2012/065905 filed on Jun. 21, 2012 and designated the U.S., the entire contents of which are incorporated herein by reference.

FIELD

The invention relates to information processing system, information processing method, and communication device.

BACKGROUND

It is performed to provide various information processing services, which are executed by an information processing device through a network, to an user. An example of this information processing service includes so-called cloud service.

As this cloud service, there is a service that a service provider starts a virtual machine on the information processing device which was established, for example, in a datacenter, and provides the software of which the virtual machine executes, to the user. In addition, the software includes, for example, OS (Operating System), application program, and middleware program. Besides, for example, the service provider may provide a communication device such as router device and a network, as the hardware installed in the datacenter.

PATENT DOCUMENT (patent document 1) Japanese Laid-Open patent publication No. 2002-117230
(patent document 2) Japanese Laid-Open patent publication No. 2001-326696
(patent document 3) Japanese Laid-Open patent publication No. 2011-250209

SUMMARY

The user utilizes the information processing service provided in the datacenter through a terminal device. The terminal device is connected to the information processing service via an access router. The access router is a router which performs proper process for the terminal to use the cloud service. The access router performs the connection to the information processing service which is registered beforehand, depending on the connection request from the user. However, because the information processing service registered with an access router is limited to one, it is difficult that the user connects to the information processing service except the same information processing service, when a plurality of users are connected to the same access router and are going to use the cloud service.

In one aspect, a purpose of this invention is to provide a state that the plurality of users are available to each of the information processing services via one communication device (e.g., an access router).

In one aspect, the information processing system has a first device which performs the information processing service by executing software, a second device which stores a first information to start the software and a second information to establish a virtual communication network which communicates with the software via the network, which are defined for each of a plurality of users, and a communication device which controls communication via the network between the first device and a terminal device of the user. And the communication device receives certification information to authenticate the user of the information processing service from the terminal device and request the certification of the user, and the second device authenticates the user and transmits the first information and the second information, which are defined for every user of the information processing service, to the communication device when the certification of the user succeeds. And the communication device receives the first information and the second information, and transmits a first command to instruct the start of the software based on the first information which is received to the first device, and the first device receives the first command, starts and executes the software, and the communication device establishes the virtual communication path in the network based on the second information which is received.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram indicating an example of the cloud service administration table T2.

FIG. 9 is a diagram indicating an example of the virtual router HW table T11.

FIG. 23 is a diagram indicating an example of the cloud service administration table T31.

DESCRIPTION OF EMBODIMENTS

[First Embodiment]
(Information System)

Figure 1:
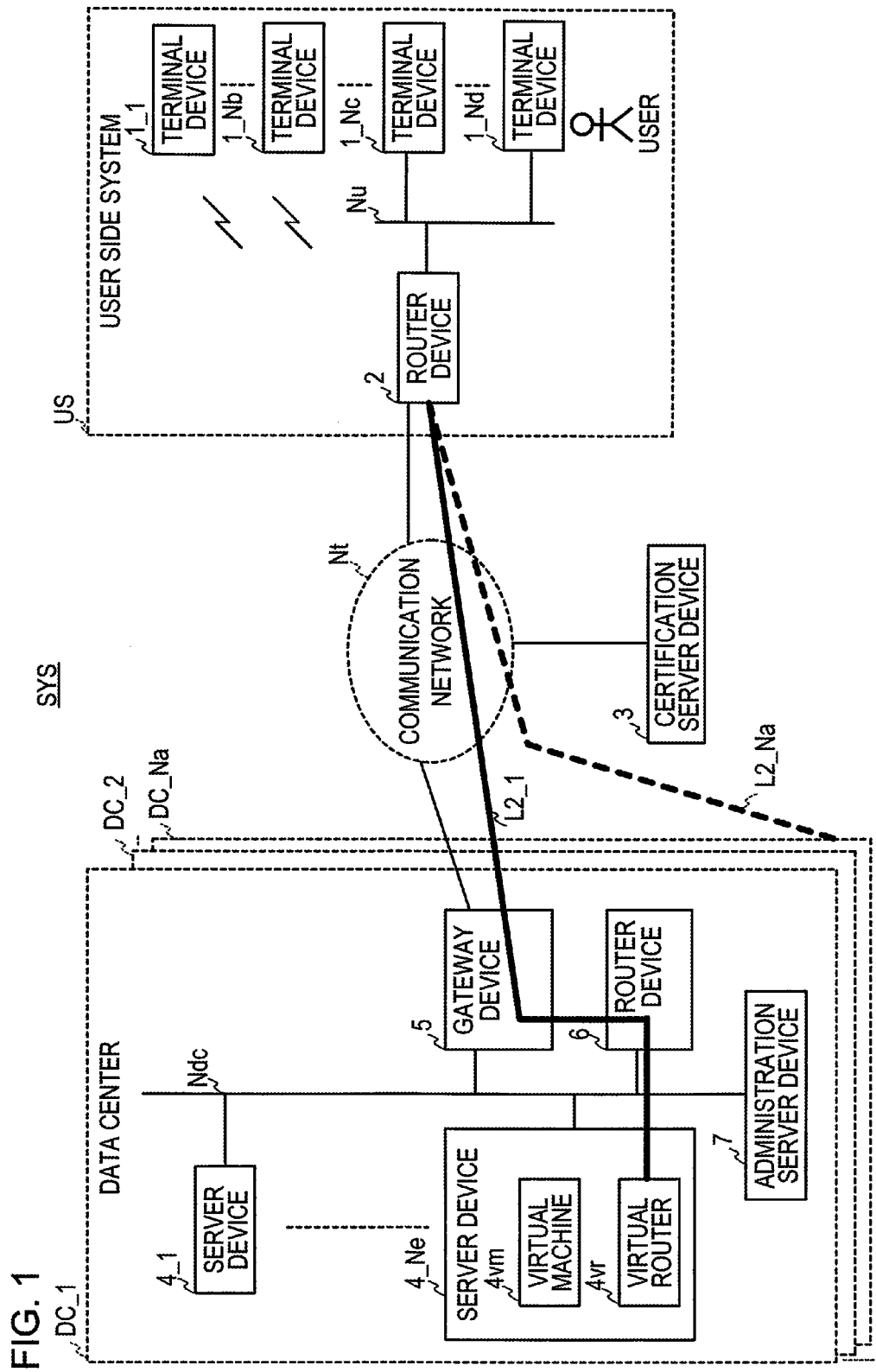
FIG. 1 is a hardware block diagram explaining the information processing system SYS according to the first embodiment.

FIG. 1 is a hardware block diagram explaining the information processing system SYS according to the first embodiment.

The information processing system SYS has a first datacenter DC_1-Na-th datacenter DC_Na (Na is the integer which is more than 2), an user side system US and a certification server device 3 to connect to communication network Nt. The first datacenter DC_1-Na-th datacenter DC_Na are examples of the first device which executes the software, performs the information processing service and provides the information processing service to the user. For example, the information processing service is cloud service, and this cloud service is called as SaaS (Software as a Service).

The user side system US is a system using this cloud service. Between the datacenter DC_1-Na-th datacenter DC_Na and the user side system US, the communication network Nt, which a carrier providing various communication services such as the data communication installed, is provided.

The user side system US has a first terminal device 1_1-Nb-th terminal device 1_Nb (Nb is the integer which is more than 2) and Nc-th (Nc is an integer more than Nb) terminal device 1_Nc-Nd-th (Nd is an integer more than Nc) terminal device 1_Nd which are the information processing device of which the user uses (below, called as a terminal). For example, these terminals are a desktop type, a laptop type, or a tablet-shaped personal computer. Besides, these terminals may be small communication terminal devices such as a mobile smart phone. Furthermore, the user side system US has the router device 2 of which these terminals connect.

The first terminal device 1_1-Nb-th terminal device 1_Nb have a wireless communication function and connects with the router device 2 through so-called wireless LAN (Local Area Network) and performs data communication with wireless. A standard of the data communication with this wireless includes, for example, IEEE 802.11.

The Nc-th terminal device 1_Nc-the Nd-th terminal device Nd has a cable communication function and connect to the router device 2 through internal network Nu which is so-called cable LAN.

The router device 2 is a router device which executes proper process that the terminal devices such as the first terminal device 1_1 use the cloud service, and the router device 2 is called the access router. The router device 2 is a communication device which usually the routing of the packet and interconnects between networks. The router device 2 executes the connection processing to a first layer (physical layer)-a third layer (network layer) in OSI (Open Systems Interconnection) basic reference model, and, for example, has a wireless communication function in addition to a cable communication function. The router device 2 connects with the first terminal device 1_1-the Nb-th terminal device 1_Nb using the wireless communication function and connects to the Nc-th terminal device 1_Nc-the Nd-th terminal device 1_Nd using the cable communication function. Furthermore, the router device 2 connects with the communication network Nt using the cable communication function and the wireless communication function. The communication network Nt, for example, is wide area IP (is Internet Protocol) communication network.

The router device 2 is an example of the communication device which controls the communication through the network (communication network Nt) between the datacenter DC_1 and the terminal device 1_1 of the user, for example.

The certification server device 3 authenticates the user of the cloud service and stores the first information to start the above software and the second information to establish the virtual communication path communicating with the software through the network, which are defined for every user of the cloud service. In addition, the first information and the second information will be explained later.

The first datacenter DC_1 has a first server device 4_1-Ne-th server device 4_Ne (Ne is the integer which is more than 2), a gateway device 5, a router device 6 and an administration server device 7 which are connected mutually through an internal network Ndc which is cable LAN, for example.

The Ne-the server device 4_Ne starts a virtual machine 4vm and a virtual router 4vr which are software and executes the software. In addition, the other server device such as the first server device 4_1 is constitution like the server device 4_Ne, too. The virtual machine 4vm executes the software which provides various information processing services to the user in the user side system US. The virtual router 4vr controls the data output from the virtual machine 4vm, and data input to the virtual machine 4vm. In other words, the virtual router 4vr executes the routing process of the communication packet for the virtual machine 4vm and controls communication processing of the virtual machine 4vm. Here, it is not needed that the virtual router and the virtual machine correspond to one to one. The first server device 4_1 may start and execute the virtual router corresponding to the virtual network to which the virtual machine group belongs, for example. In addition, the virtual router is also called as a router VM (Virtual Machine).

The Ne-th server device 4_Ne is an example of the service execution device which provides the cloud service by executing software (for example, the virtual machine 4vm, the virtual router 4vr).

The gateway device 5 performs interconnection with the first datacenter DC_1 and the communication network Nt. For example, the gateway device 5 has an impedance matching function and a protocol conversion function and absorbs the difference of a communication medium and the transmission method between the first datacenter DC_1 and the communication network Nt and executes interconnection with the first datacenter DC_1 and the communication network Nt.

The router device 6 performs the routing of the packet in the first datacenter DC1_1 and executes the interconnection between each device.

The administration server device 7 is a server device which administrates the first server device 4_1-the Ne-th server device 4_Ne, the gateway device 5 and the router device 6.

Also, the second datacenter DC_2-the Na-th datacenter DC_Na have same equipment component as the first datacenter DC_1.

The router device 2 in the user side system US establishes a virtual communication path (called as a tunnel appropriately as follows) which functions as a closed virtual direct connection communication path to connect between a first connection point (also called as connection node) and a second connection point. In FIG. 1, the first connection point is the router device 2, and the second connection point is the virtual router 4vr in the datacenter DC_1. FIG. 1 illustrates the tunnel between the first and the second connection points schematically in mark "L2_1". In addition, a mark "L2_Na" represents the tunnel that the router device 2 established between the router device 2 and the virtual router (not illustrated in FIG. 1) in the Na-th datacenter DC_Na. This tunnel is a tunnel which encapsulates an Ethernet frame (as for the Ethernet a registered trademark) in the second layer (also called as layer 2) of the OSI basic reference model, and this tunnel is called so-called L (Layer) 2 tunnel. For example, for a protocol to perform establishment (also called as a construction, a formation, an establishment) of the L2 tunnel between the router device 2 and the virtual router 4vr, there is GRE (Generic Routing Encapsulation), OpenVPN (Virtual Private Network), and L2TP (Layer 2 Tunneling Protocol).

(User System)

Figure 2:
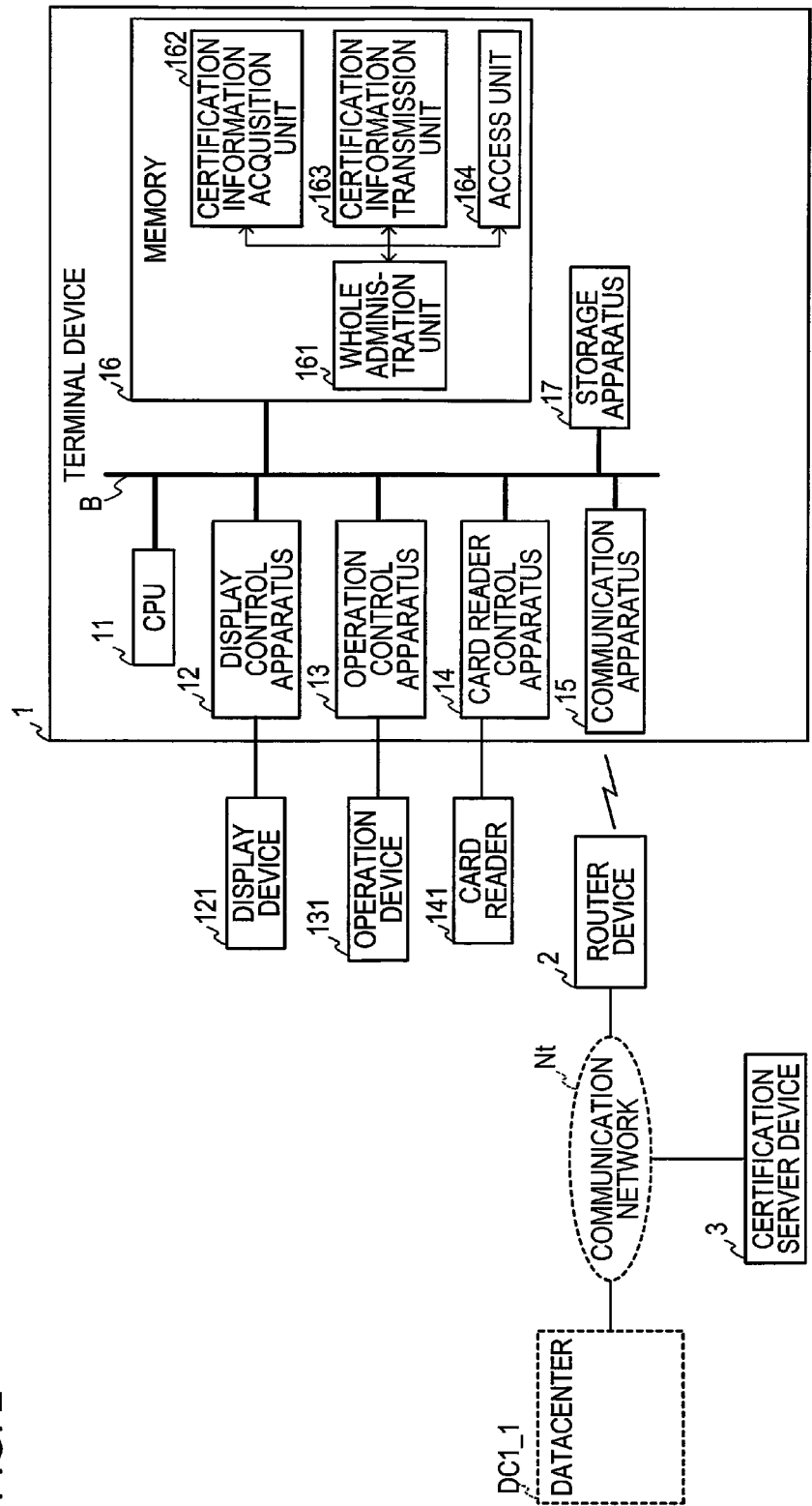
FIG. 2 is a hardware block diagram of the terminal device depicted in FIG. 1.

FIG. 2 is a hardware block diagram of the terminal device depicted in FIG. 1. In FIG. 2, the terminal device 1 represents either one terminal device among the terminal device 1_1-the Nb-th terminal device 1_Nb which has a wireless communication function in FIG. 1. A display device 121 such as liquid crystal display, an operation device 131 such as a keyboard or a mouse, and a card reader 141 reading user certification information stored in the user identification card that each user have, are connected to the terminal device 1. This user identification card is called as a smart card.

The terminal device 1 has a CPU (Central Processing Unit) 11, a display control apparatus 12, an operation control apparatus 13, a card reader control apparatus 14, a communication apparatus 15, a memory 16 and a storage apparatus 17 which are connected mutually.

The CPU 11 is an arithmetic processor (also called as a control unit or a computer) which controls the whole of the terminal device 1. The display control apparatus 12 performs processing to display various images to the display device 121. Here, the various images are an user certification screen and a tunnel establishment notice screen, as described later. The operation control apparatus 13 executes various processing depending on operation instructions for the operation instructions input from the operation device 131. The card reader control apparatus 14 controls processing to read the user certification information from the user identification card inserted in the card reader 141.

The communication apparatus 15 is a wireless LAN cordless handset unit for executing the wireless communication with the router device 2. In addition, this communication apparatus 15 is so-called a network interface card (NIC: Network Interface Card) when the terminal device 1 has a cable communication function.

The memory 16 stores data which is processed in various information processing that the CPU 11 executes, and various programs temporarily.

The whole administration unit 161 in the memory 16 administrates various processing that the terminal device 1 executes. The whole administration unit 161 administrates, for example, a certification information acquisition unit 162, a certification information transmission unit 163, an access unit 164 and executes the transmission and reception processing of the communication packet to the device connected to the communication apparatus 15.

The certification information acquisition unit 162 acquires the identifier (ID) of a user distinguishing the user of the cloud service, and certification information to confirm whether or not this user is a fair user of this cloud service, from the operation control apparatus 13 or the card reader control apparatus 14. In addition, the certification information will be explained in FIG. 13 in detail. The certification information transmission unit 163 transmits the certification information that the certification information acquisition unit 162 acquired to the certification server device 3 through the router device 2. The access unit 164 executes processing to access the virtual machine operated in the datacenter DC_1.

The whole administration unit 161, the certification information acquisition unit 162, the certification information transmission unit 163, and the access unit 164 are so-called programs. And, for example, these programs are stored in to the storage apparatus 17. The CPU 11 retrieves these programs from the storage apparatus 17 at the time of start, and develops it in the memory 16 and functionalizes these programs as a software module.

The storage apparatus 17 is constructed by, for example, a magnetic memory apparatus such as a hard disk drive (HDD: Hard Disk Drive) or a nonvolatile memory, and stores the above program and various data.

Figure 3:
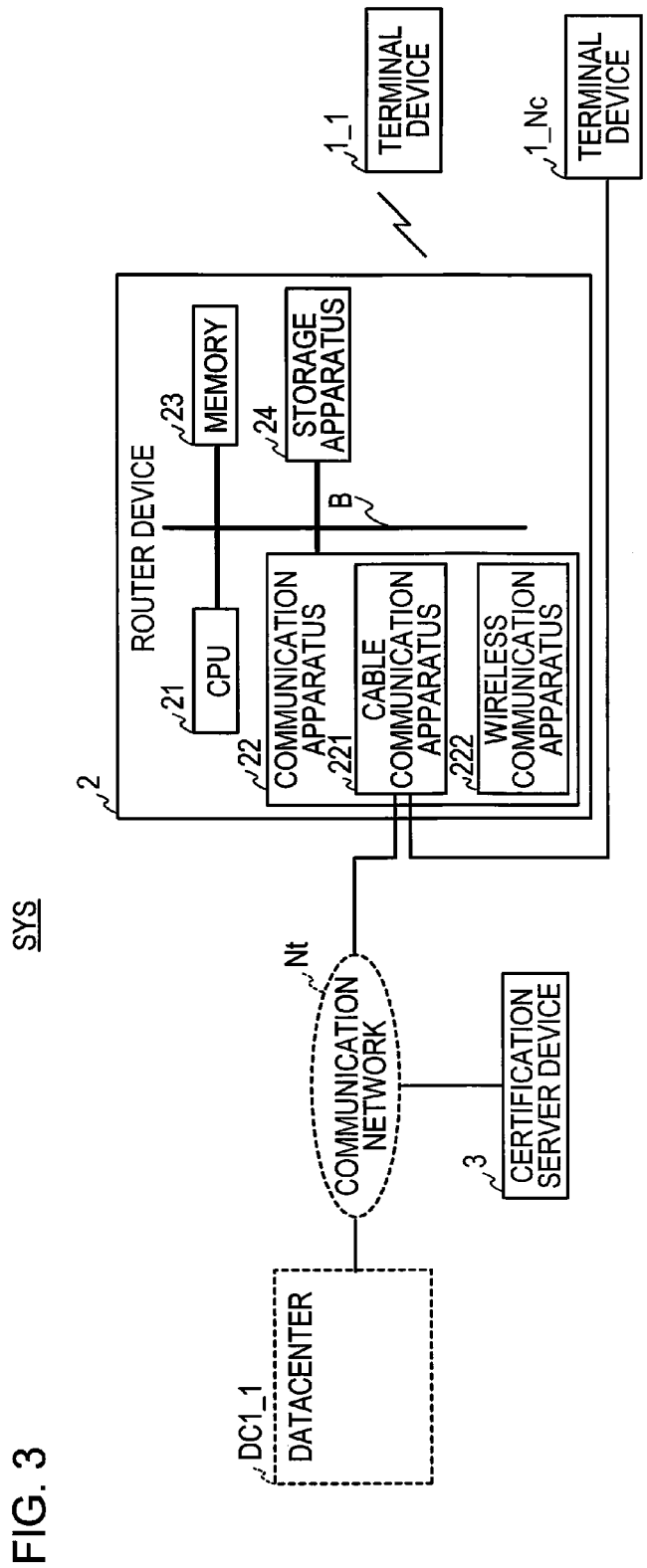
FIG. 3 is a hardware block diagram of the router device (access router device) depicted by FIG. 1.

FIG. 3 is a hardware block diagram of the router device (access router device) depicted by FIG. 1. The router device 2 has a CPU 21, a communication apparatus 22, a memory 23 and a storage apparatus 24 which are connected mutually through a bus B, for example.

The CPU 21 is an arithmetic processor for controlling the whole of the router device 2. The communication apparatus 22 has a cable communication apparatus 221 which executes the cable communication and a wireless communication apparatus 222 which executes the wireless communication. The cable communication apparatus 221, for example, has a plurality of NIC and connects to the communication network Nt through a cable and performs the communication with various devices connecting to this communication network Nt. In addition, the cable communication apparatus 221 connects to the terminal device 1_Nc, etc. having the cable communication function and communicates with it. For example, the first NIC (not illustrated in FIG. 3) in the cable communication apparatus 221 connects to the communication network Nt through the cable, and the second NIC (not illustrated in FIG. 3) connects to the terminal device 1_Nc having the cable communication function. In addition, a communication line to connect to the datacenter DC1_1 is not only a cable broadcasting line and is enough for even a public wireless line, and a mobile line.

The wireless communication apparatus 222 is a wireless LAN parent device which performs wireless connection to the terminal device 1_1, etc. having the wireless communication function and executes the communication.

The memory 23 stores data which is processed in various information processing that the CPU 21 executes and various programs, temporarily.

The storage apparatus 24 is, for example, a magnetic memory apparatus or a nonvolatile storage apparatus. The storage apparatus 24 stores a program and various data which is explained in FIG. 4.

Figure 4:
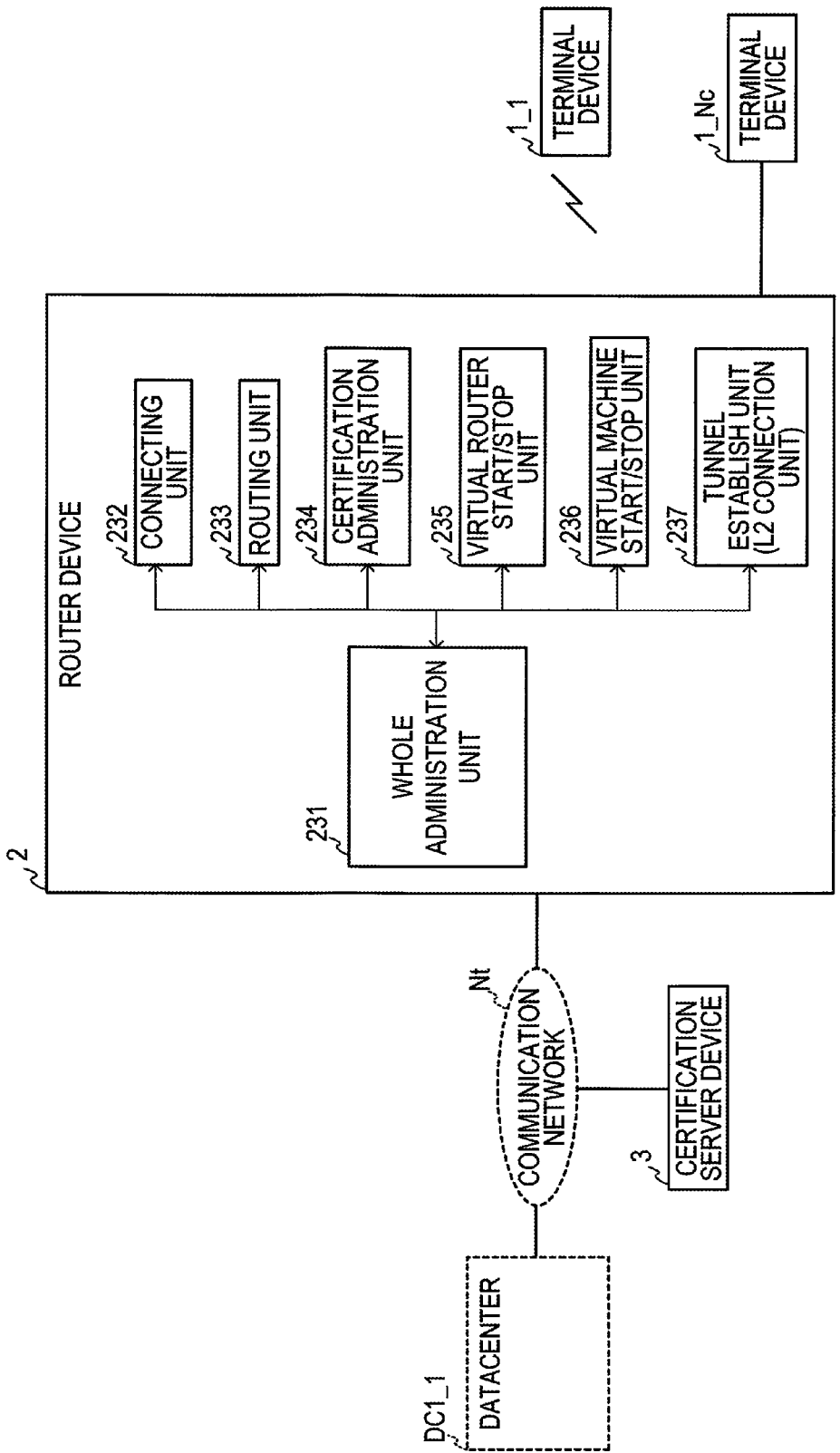
FIG. 4 is a block diagram of the software module of which the router device (access router device) in FIG. 3 executes.

FIG. 4 is a block diagram of the software module of which the router device (access router device) in FIG. 3 executes.

Whole administration unit 231 administrates various processing that the router device 2 executes. For example, the whole administration unit 231 administrates a connection unit 232, a routing unit 233, a certification administration unit 234, a virtual router start/stop unit 235, a virtual machine start/stop unit 236, and a tunnel establishment unit (L2 connection unit) 237. The whole administration unit 231 executes the transmission and reception process of the communication packet to a device which connects with the communication apparatus 22 (referring to FIG. 3).

The connection unit 232 establishes a connection with the terminal device 1_1, etc. and executes two-way communication. The routing unit 233 executes the data communication processing (routing) between the router device 2 and other devices. In addition, for example, other devices include the terminal device 1_1 and the certification server device 3 and the gateway device 5 in the datacenter DC1_1 depicted by FIG. 1. Besides, the router device 2 executes the data communication processing between the router device 2 and the virtual router.

The certification administration unit 234 administrates the user certification processing for the certification server device 3. The virtual router start/stop unit 235 instructs to the administration server device 7 (referring to FIG. 1) to execute start processing and the stop processing of the virtual router. The virtual machine start/stop unit 236 instructs to the administration server device 7 to execute the start processing and the stop processing of the virtual machines. The tunnel establishment unit 237 establishes the tunnel between the router device 2 and the virtual router which started based on L2 protocol corresponding to the ID of an authenticated user.

The whole administration unit 231, the connection unit 232, the certification administration unit 234, the routing unit 233, the virtual router start/stop unit 235, the virtual machine start/stop unit 236, and the tunnel establishment unit 237 are so-called programs. And these programs are stored into the storage apparatus 24 in FIG. 3, for example. Further, the CPU 21 in FIG. 3 retrieves these programs from the storage apparatus 24 at the time of start, and develops it in the memory 23 and functionalizes these programs as a software module.

(Certification Server Device)

Figure 5:
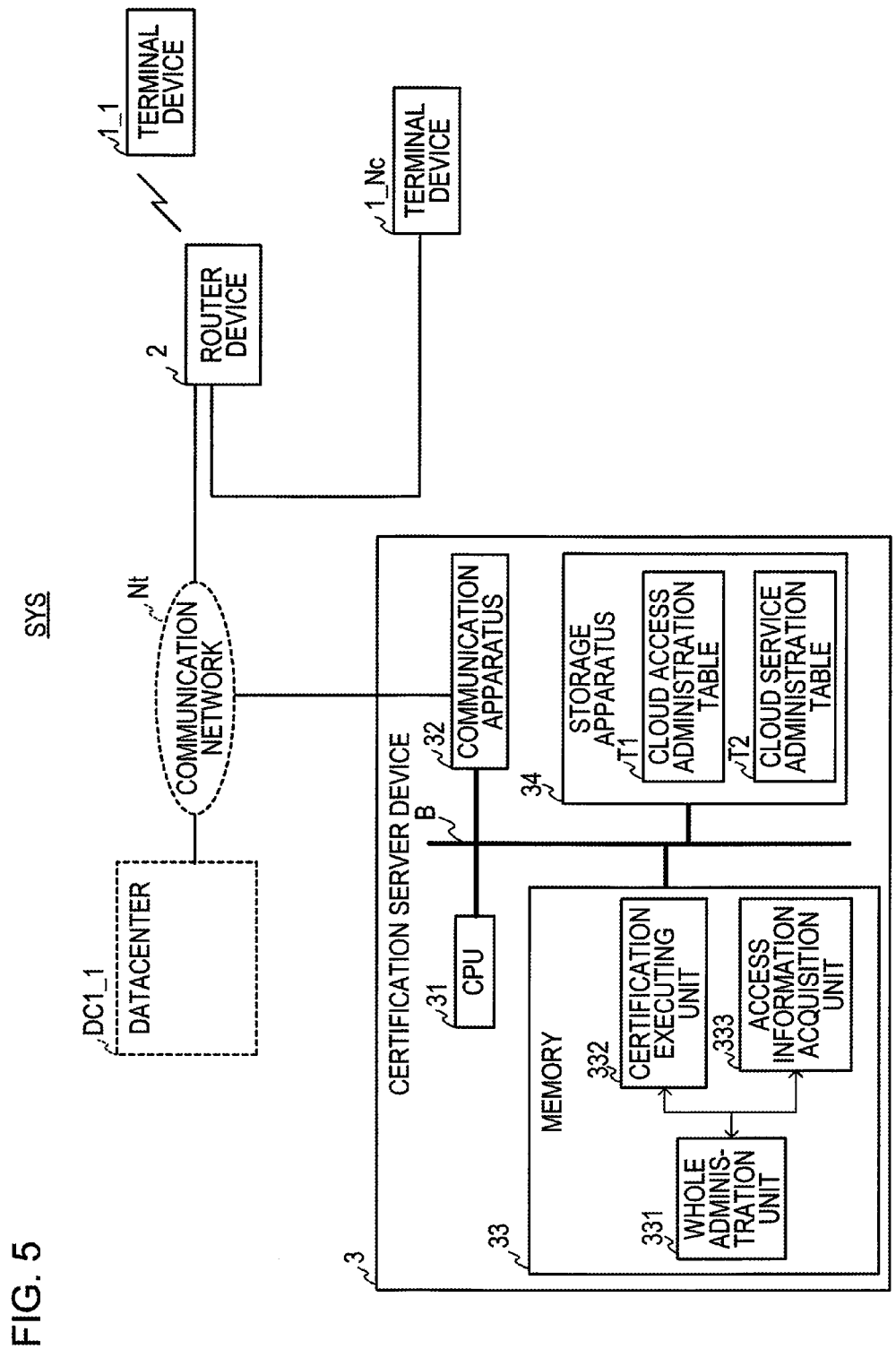
FIG. 5 is a hardware block diagram of the certification server device depicted by FIG. 1.

FIG. 5 is a hardware block diagram of the certification server device depicted by FIG. 1.

The certification server device 3 has a CPU 31, a communication apparatus 32, a memory 33 and a storage apparatus 34 which are connected mutually through a bus B, for example.

The CPU 31 is an arithmetic processor which controls the whole of the certification server device 3. The communication apparatus 32, for example, is a NIC, and connects to the communication network Nt in FIG. 1 through a cable and performs the communication with various devices connecting to this communication network Nt.

The memory 33 stores data which is processed in various information processing that the CPU31 executes and various programs, temporarily.

The whole administration unit 331 in the memory 33 administrates various processing that the certification server device 3 executes. The whole administration unit 331 administrates, for example, a certification executing unit 332, an access information acquisition unit 333 and executes the transmission and reception processing of the communication packet to a device which is connected to the communication apparatus 32.

The certification executing unit 332 executes the certification processing of the user in the user side system US depicted by FIG. 1. The access information acquisition unit 333 acquires cloud access information to access the cloud service that the datacenter DC1_1 in FIG. 1 provides, and transmits the cloud access information which is acquired to the router device 2. The cloud access information has a first information to start the software and a second information to establish a tunnel to communicate the software through the network (for example, network Nt), which are defined for every user of the cloud service.

The whole administration unit 331, the certification executing unit 332, the access information acquisition unit 333 are so-called programs. And, for example, these programs are stored into the storage apparatus 34. The CPU 31 retrieves these programs from the storage apparatus 34 at the time of start, and develops it in the memory 33 and functionalizes these programs as a software module.

The storage apparatus 34, for example, is a magnetic memory apparatus or a nonvolatile storage apparatus. The storage apparatus 34 stores the above program and various data and cloud access administration table T1 having needed information to access the cloud service, and cloud service administration table T2 for administrating the cloud service.

The cloud access administration table T1 and the cloud service administration table T2 depicted by FIG. 5 will be explained based on FIG. 6, FIG. 7.

Figure 6:
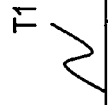
FIG. 6 is a diagram indicating an example of the cloud access control table T1.

FIG. 6 is a diagram indicating an example of the cloud access control table T1. The cloud access control table T1 in FIG. 6 has user ID column and the start/stop information column of the virtual router and the IP address column of the virtual router and the L2 protocol column and the SaaS ID column.

The user ID column stores a user ID distinguishing the user of the cloud service. The start/stop information column of the virtual router stores the start/stop information of the virtual router corresponding to the user ID. The IP address column of the virtual router stores the IP address of this virtual router. The L2 protocol column stores the type of the protocol to establish the tunnel between this virtual router and the router device 2. The SaaS ID column stores SaaS ID distinguishing the cloud service that the user having the user ID stored in the user ID column uses.

In FIG. 6, the user ID column stores three user IDs, that is, "User-A", "User-B", "User-C". The start/stop information column of the virtual router stores "API_VR-A", "API_VR-B", "API_VR-C" as the start/stop information of the virtual router corresponding to each of above three user IDs.

In FIG. 6, the IP address column of the virtual router stores "x1.x2.x3.x4", "y1.y2.y3.y4", "z1.z2.z3.z4" as an IP address of the virtual router corresponding to the three user IDs. The L2 protocol column stores "GRE" (Generic Routing Encapsulation), "OpenVPN" (Virtual Private Network), and "L2TP" (Layer 2 Tunneling Protocol) as the type of the protocols corresponding to each of above three user IDs. The SaaS ID column stores "SaaS-0", "SaaS-1", and "SaaS-0" as the SaaS ID corresponding to each of above three user IDs.

The API (Application Program Interface) of the start/stop information of the virtual router which is explained in FIG. 6 was provided by the provider of the cloud service. The virtual router start/stop unit 235 in the router device 2 in FIG. 4 sets the IP address of the virtual router which starts, the user ID and a start instruction option, as an argument in this API and executes this API. The virtual router start/stop unit 235 transmits the start command of the virtual router to the administration server device 7 in FIG. 8 based on this API. This start command has the IP address of the virtual router, the user ID, and the start instruction option, which are set as an argument. In addition, this API is, for example, "http://www.hogehoge.com/cloud/vr/x1.x2.x3.x4/User-A/ On". The meaning of this API is to instruct to the administration server device 7 in FIG. 8 which is appointed in "www.hogehoge.com", so as to start ("On") the virtual router ("Vr") which the user ID "User-A" and the IP address "x1.x2.x3.x4".

Figure 8:
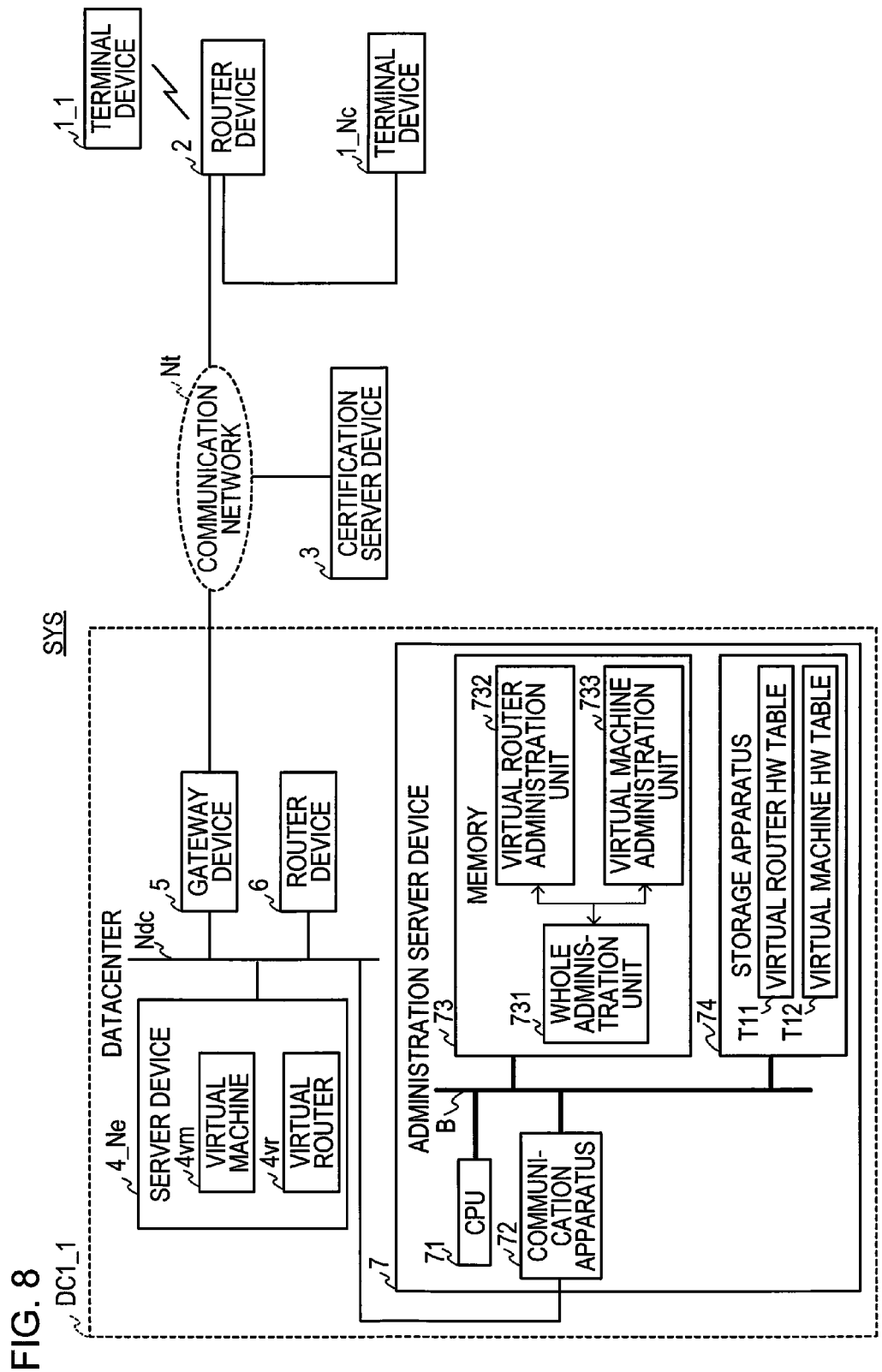
FIG. 8 is a hardware block diagram of the administration server device 7 in FIG. 1.

The administration server device 7 in FIG. 8 starts the virtual router having an IP address, which is set as the argument, in the server device 4_Ne in FIG. 1, based on this start command, for example.

FIG. 7 is a diagram indicating an example of the cloud service administration table T2. The cloud service administration table T2 in FIG. 7 has SaaS ID column, the start/stop information column of the virtual machine, the IP address column of the virtual machine and a use protocol column. The SaaS ID column stores the SaaS ID which is depicted in FIG. 6. The start/stop information column of the virtual machine stores the start/stop information of the virtual machine. The IP address column of the virtual machine stores the IP address of this virtual machine. The use protocol column stores a protocol to use when accessing this virtual machine.

In FIG. 7, the SaaS ID column stores two IDs, that is, "SaaS-0" and "SaaS-1" as the SaaS ID, and the start/stop information column of the virtual machine stores "API_VM-A", "API_VM-B" as the start/stop information of the virtual machine corresponding to each of above two SaaS IDs.

In FIG. 7, the IP address column of the virtual machine stores "xx1.xx2.xx3.xx4", "yy1.yy2.yy3.yy4" as the IP address of the virtual machine corresponding to each of above two SaaS IDs. The use protocol column stores HTTP (Hypertext Transfer Protocol), SMB (Server Message Block) as the protocol corresponding to each of above two SaaS IDs.

The API of the start/stop information of the virtual machine which is explained in FIG. 7 was provided by the provider of the cloud service. The virtual machine start/stop unit 236 in the router device 2 in FIG. 4 sets the IP address of the virtual machine which starts, the SaaS ID and the start instruction option, for example, as the argument in this API and executes this API. The virtual machine start/stop unit 236 transmits the start command of the virtual machine to the administration server device 7 in FIG. 8 based on this API. This start command has the IP address of the virtual machine, the SaaS ID, and the start instruction option which are set as the argument. In addition, for example, this API is "http://www.hogehoge.com/cloud/vm/xx1.xx2.xx3.xx4/ SaaS-0/On". The meaning of this API is to instruct to the administration server device 7 in FIG. 8 appointed in www.hogehoge.com, so as to start ("On") the virtual machine ("Vm") of which the SaaS ID "SaaS-0" and the IP address "xx1.xx2.xx3.xx4".

The administration server device 7 in FIG. 8 starts the virtual machine having the IP address, which is set as the argument, on the server device 4_Ne in FIG. 1, based on this start command.

The first information to start the virtual router and the virtual machine (software) which are defined for each user of the cloud service, includes, for example, the start /stop information of the virtual router, the IP address of the virtual router which are depicted by FIG. 6, the start/stop information of the virtual machine and the IP address of the virtual machine which are depicted by FIG. 7. And the second information to establish a tunnel communicating through this software and the network (for example, the communication network Nt) is the L2 protocol which is depicted by FIG. 6.

For example, the first information for user "Use-A" of the cloud service which is distinguished by the user ID, is defined that the start/stop information of the virtual router is "API VR-A" and the IP address of the virtual router is "x1.x2.x3.x4" as depicted by FIG. 6. Furthermore, the above first information is defined that the start/stop information of the virtual machine is "API_VM-A" and the IP address of the virtual machine is "xx1.xx2.xx3.xx4" as depicted by FIG. 7, corresponding to the SaaS ID "SaaS-0" distinguishing the cloud service of the user "Use-A". And the second information is defined as the L2 protocol "GRE" for the user "Use-A".

(Administration Server Device)

FIG. 8 is a hardware block diagram of the administration server device 7 in FIG. 1. The administration server device 7 has a CPU 71, a communication apparatus 72, a memory 73 and a storage apparatus 74 which are connected mutually through a bus B, for example.

The CPU 71 is an arithmetic processor which controls the whole of the administration server device 7. The communication apparatus 72 is, for example, NIC and connects to the internal network Ndc by a cable and performs the communication with various devices connecting to internal network Ndc.

The memory 73 stores data which is processed in various information processing that the CPU 71 executes and various programs, temporarily.

Whole administration unit 731 in the memory 73 administrates various processing of which the administration server device 7 executes. For example, the whole administration unit 731 executes the transmission and reception processing of the communication packet to a device which connects with the communication apparatus 72, together to administrate the virtual router administration unit 732 and the virtual machine administration unit 733. The virtual router administration unit 732 administrates the virtual router which controls the data output from the virtual machine executed in the server device, and the data input to the virtual machine. The virtual machine administration unit 733 administrates this virtual machine.

The whole administration unit 731, the virtual router administration unit 732, and the virtual machine administration unit 733 are so-called programs, and, for example, these programs are stored in the storage apparatus 74. The CPU 71 retrieves these programs from the storage apparatus 74 at the time of start, and develops it in the memory 73, and functionalizes these programs as a software module.

The storage apparatus 74 is, for example, a magnetic memory apparatus or a nonvolatile storage apparatus. The storage apparatus 74 stores the above program and various data. Furthermore, the storage apparatus 74 stores virtual router HW table T11, which stores quantity of resources of hardware (HW: Hard Ware) to assign to the virtual router, and virtual machine HW table T12 which stores hardware to assign to the virtual machine. In addition, a plurality of virtual machines may cooperate and may execute various information processing, as well as one virtual machine executes various information processing.

The virtual router HW table T11 and the virtual machine HW table T12, which are represented by FIG. 8, will be explained based on FIG. 9, FIG. 10.

FIG. 9 is a diagram indicating an example of the virtual router HW table T11.

In FIG. 9, the virtual router HW table T11 has a user ID column, a CPU column, a memory column, a storage apparatus column and a communication band column. The user ID column stores a user ID distinguishing the user of the cloud service. The CPU column stores clock speed (Giga Hz) of the CPU to assign to the virtual router corresponding to this user ID. The memory column stores memory capacity (Giga byte) to assign to this virtual router. The storage apparatus column stores capacity (Mega byte) of the storage apparatus to assign to this virtual router. The communication band column stores a communication band (Giga bps) of the data communication to assign to this virtual router.

In FIG. 9, the user ID column stores three user IDs, that is, "User-A", "User-B", "User-C". The CPU column stores "1.0", "1.5", "1.0" (Giga Hz) as the clock speed of the CPU's to assign to the virtual router corresponding to each of above three user IDs. In addition, in the case that maximum clock speed of the CPU is 3.0 Giga Hz, when the clock speed of the CPU to assign to a virtual router is "1.0" Giga Hz, this virtual router is able to occupy this CPU for one thirds (1/3) of the 3.0 Giga Hz that was performed time sharing.

The memory column stores "1.0", "1.5", "1.2" (Giga byte) as the memory capacity to assign to the virtual router corresponding to each of above three user IDs. In addition, when the memory capacity to assign to the virtual router is "1.0" Giga byte, the virtual router is assigned a memory area equivalent to "1.0" Giga byte in this memory.

The storage apparatus column stores "100.0", "200.0", "250.0" (Giga byte) as the capacity of the storage apparatus to assign to the virtual router corresponding to each of above three user IDs. The communication band column stores "1.2", "1.5", "1.2" (Giga bps) as the communication band width to assign when the virtual router corresponding to each of above three user IDs executes the communication. In addition, when the capacity of the storage apparatus to assign to a virtual router is "100.0" Giga byte, the virtual router is assigned an area equivalent to "100.0" Giga byte in this memory. When the communication band to assign to the virtual router is "1.2" Giga bps (bit per second), in a case that a maximum communication band of the communication device (for example, NIC), is 4.0 Giga bps, this virtual router is able to occupy this communication device for the one point two fourths (1.2/4.0) in 4.0 Giga bps that was performed time sharing.

Figure 10:
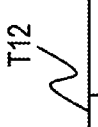
FIG. 10 is a diagram indicating an example of the virtual machine HW table T12.

FIG. 10 is a diagram indicating an example of the virtual machine HW table T12.

In FIG. 10, the virtual machine HW table T12 has a SaaS ID column, a CPU column, a memory column, a storage apparatus column, a communication band column and a software column. The SaaS ID column stores SaaS ID to distinguish the cloud service. The CPU column stores clock speed (Giga Hz) of the CPU to assign to the virtual machine corresponding to the SaaS IDs. The memory column stores memory capacity (Giga byte) to assign to this virtual machine. The storage apparatus column stores capacity (Giga byte) of the storage apparatus to assign to this virtual machine. The communication band column stores a communication band (Giga bps) of the data communication to assign to this virtual machine. The software column stores the name of the OS and the application that this virtual machine executes.

In FIG. 10, the SaaS ID column stores two SaaS IDs, that is, "SaaS-0", "SaaS-1". The CPU column stores "2.0", "3.5" (Giga Hz) as the clock speed of the CPU's to assign to the virtual machine corresponding to each of above two SaaS IDs, and the memory column stores "2.0", "2.5" (Giga byte) as memory capacity to assign to the virtual machine corresponding to each of above two SaaS IDs. The storage apparatus column stores "100.0", "200.0" (Giga byte) as capacity of the storage apparatus to assign to the virtual machine corresponding to each of above two SaaS IDs, and the communication band column stores "1.0", "1.2" (Giga bps) as a communication band to assign when the virtual machine corresponding to each of above two SaaS IDs executes communication. Furthermore, the software column stores names of the OS and the application that the virtual machine corresponding to each of above two SaaS IDs executes, that is, "OS0, App0$a$, App0$b$", "OS1, App1$b$, App1$b$". Here, the "OS0" is the name of the OS that the virtual machine of the "SaaS-0" executes, and the "App0$a$", "App0$b$" are the names of the applications that this virtual machine executes. Similarly, the "OS1" is the name of the OS that the virtual machine of "SaaS-1" executes, and the "App1$a$", "App1$b$" are the name of the application that this virtual machine executes.

(Server Device)

Figure 11:
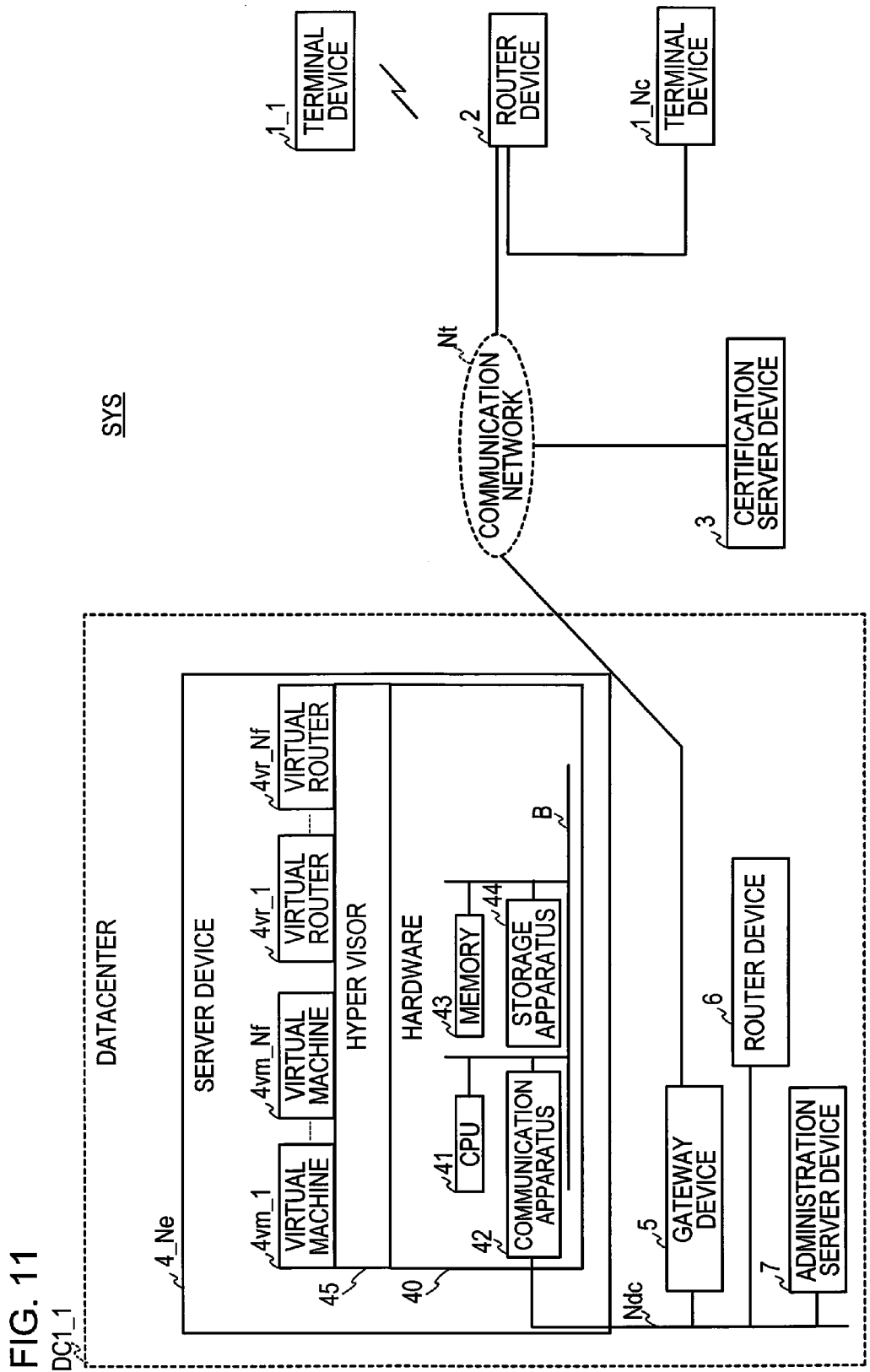
FIG. 11 is a hardware block diagram of the server device in the datacenter DC_1 depicted by FIG. 1.

FIG. 11 is a hardware block diagram of the server device in the datacenter DC_1 depicted by FIG. 1. In FIG. 11, the Ne-th server device 4_Ne in FIG. 1 is exemplified and explained, but other server device 4_1, etc. has similar constitution.

The server device 4_Ne has a hardware 40 and a hyper visor (Hypervisor) 45 which operates on the hardware 40. In addition, the hyper visor is also called the virtualization software.

Furthermore, the server device 4_Ne has first virtual router 4$vr$_1-Nf-th (Nf is an integer equal or more than 2) virtual router 4$vr$_Nf that the hyper visor 45 starts and administrates, and a first virtual machine 4$vm$_1-Nf-th virtual machine 4$vr$_Nf that the hyper visor 45 starts and administrates. Here, each of the first virtual router 4$vr$_1-Nf-th virtual router 4$vr$_Nf controls the data output from the first virtual machine 4$vm$_1-Nf-th virtual machine 4$vm$_Nf, and data input to the first virtual machine 4$vm$_1-Nf-th virtual machine 4$vm$_Nf. In addition, the same server device does not start the virtual machine and the virtual router, and the server device may start one virtual machine, and other server device may start a virtual router.

The hyper visor 45 is control program to virtualize the hardware 40 and start the virtual router and to virtualize the hardware 40 and start the virtual machine.

The hardware 40 in the server device 4_Ne has a CPU41, a communication apparatus 42, a memory 43 and a storage apparatus 44 which are connected mutually through a bus B, for example.

The CPU 41 is an arithmetic processor which controls the whole of the server device 4_Ne. For example, the CPU 41 may be a multi-core processor accumulating plural cores. The communication apparatus 42 is, for example, NIC, and connects to the internal network Ndc by a cable and performs the communication with various devices which connect to the internal network Ndc.

The memory 43 stores data which is processed in various information processing that the CPU 41 executes and various programs, temporarily.

The storage apparatus 44 is, for example, a magnetic memory apparatus or a nonvolatile storage apparatus. The storage apparatus 44 stores a control program to function for hyper visor 45 and various programs that are needed for communication processing such as the routing processing that the virtual router executes. Furthermore, the storage apparatus 44 stores various OS's and a program of various application that the virtual machine executes.

The CPU 41 retrieves the control program of the hyper visor 45 from the storage apparatus 44 at the time of start, and develops it in the memory 43 and functionalizes this control program as the hyper visor 45.

In addition, the CPU 41, based on control of the hyper visor 45, reads various programs that are needed for communication processing that the virtual router executes, namely the routing processing of the communication packet, from the storage apparatus 44 appropriately and develops it in the memory area of memory 43 assigned to this virtual router and executes this virtual router. Furthermore, the CPU 41, based on control of the hyper visor 45, reads a program of the OS and a program of the application of which the virtual machine executes, from the storage apparatus 44 appropriately and develops it in the memory area of memory 43 assigned to this virtual machine and executes this virtual machine.

(Flow of the Processing in the Router Device)

Figure 12:
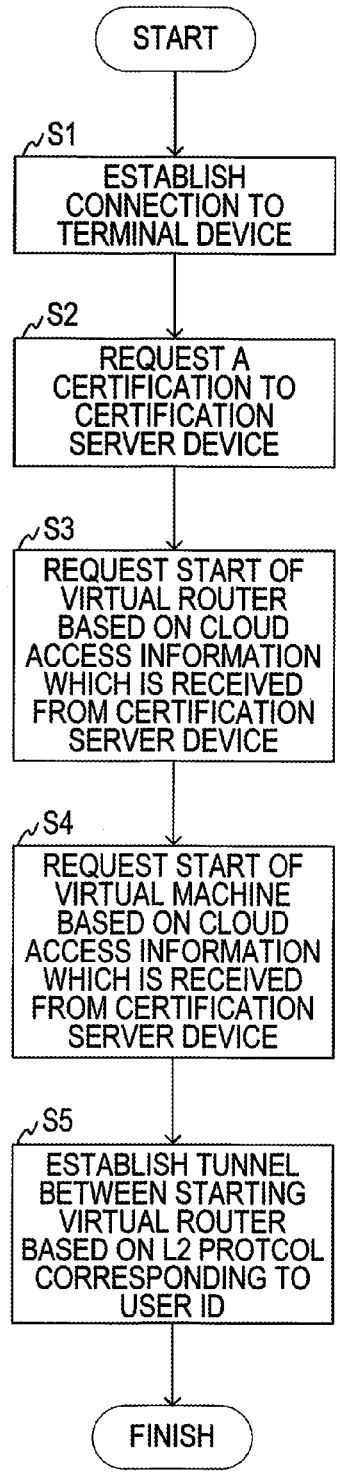
FIG. 12 is a flow diagram to explain a flow of the process in the router device 2 in FIG. 4.

FIG. 12 is a flow diagram to explain a flow of the process in the router device 2 in FIG. 4.

Step S1: The connection unit 232 in the router device 2, in response to a connection request from the terminal device 1 (referring to FIG. 2), establishes connection with the terminal device 1, and transmits a notice of connection completion to the terminal device 1. In addition, more detailed explanation about the process of the step S1 will be explained in step S23 of FIG. 13.

Step S2: The certification administration unit 234 in the router device 2 receives the certification information to authenticate the user of cloud service which is transmitted from the terminal device 1 and requests the certification to the certification server device 3. In addition, more detailed explanation about the process of the step S2 will be explained in step S25 of FIG. 13.

Step S3: The virtual router start/stop unit 235 in the router device 2 receives cloud access information which have the first information and the second information which are defined by each of the user of the cloud service, which are sent when the certification server device 3 succeeds in the certification of the user, and, based on the first information of this cloud access information, requests the start of the virtual router to the datacenter DC1_1. In addition, more detailed explanation about the process of the step S2 will be explained in step S27 of FIG. 13.

Step 4: The virtual machine start/stop unit 236 in the router device 2 requests the start of the virtual machine based on the first information of the cloud access information which is received from the certification server device 3 to the datacenter DC1_1. In addition, more detailed explanation about the process of the step S4 will be explained in step S29 of FIG. 13.

The router device 2 transmits the first command to instruct start of the software as the start requests of the virtual router and the virtual machine which are explained in the steps S3, S4, to the datacenter DC1_1.

Step S5: The tunnel establishment unit 237 in the router device 2 establishes the tunnel between the router device 2 and the virtual router which is started, based on the L2 protocol corresponding to the user ID which is authenticated. In other words, the tunnel establishment unit 237, based on the second information in the cloud access information which is received, establish a tunnel in the network (communication network Nt). In addition, more detailed explanation about the process of the step S5 will be explained in step S31 of FIG. 13.

(the flow of the start of the virtual router, the virtual machine, the flow of the tunnel establishment processing)

Next, the flow of the start of the virtual router, the virtual machine, the flow of the tunnel establishment processing according to the first embodiment will be explained based on FIG. 13 with reference to FIG. 1-FIG. 11.

Figure 13:
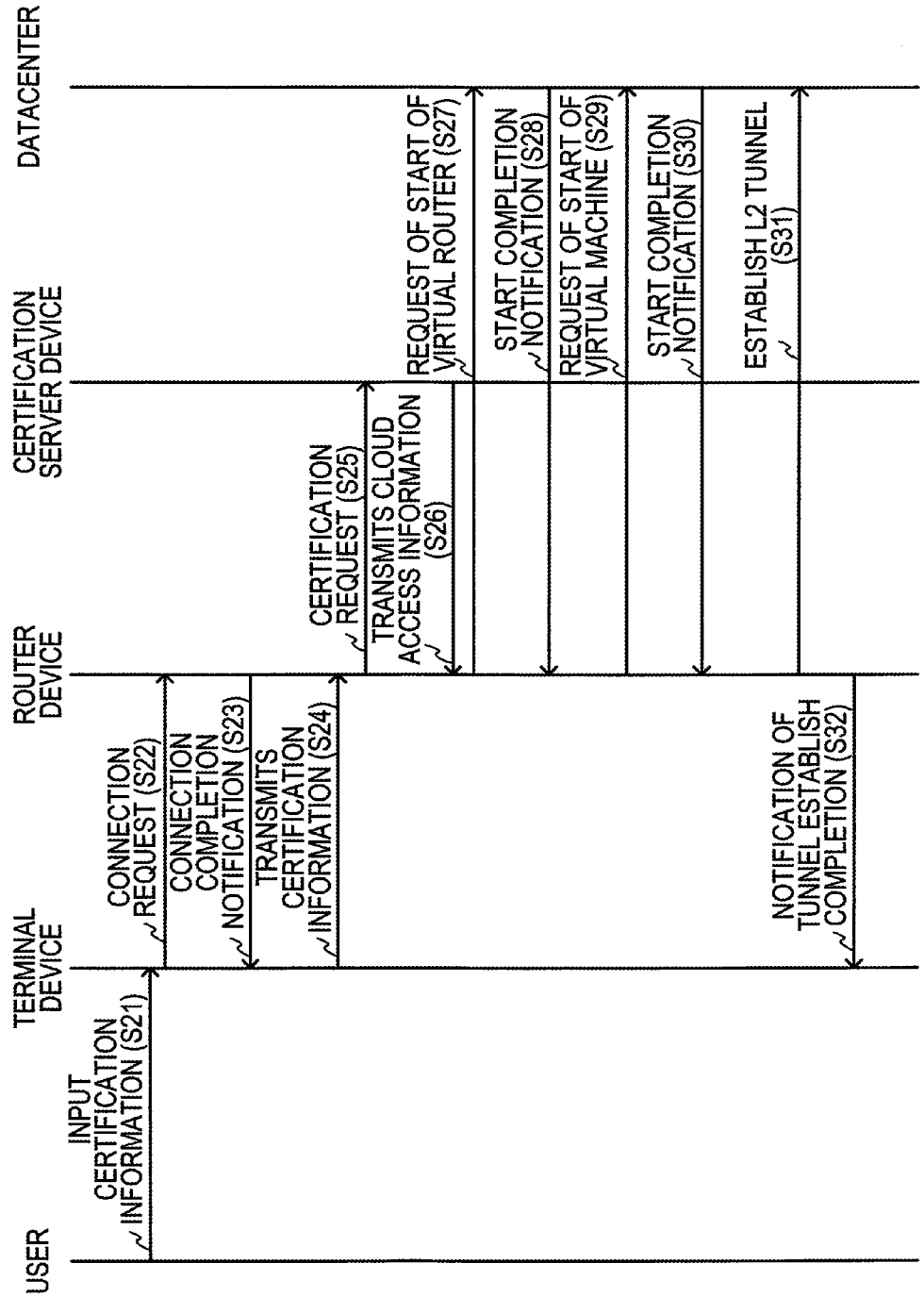
FIG. 13 is a diagram explaining the flow of the start of the virtual router, the virtual machine, the flow of the tunnel establishment processing according to the first embodiment.

FIG. 13 is a diagram explaining the flow of the start of the virtual router, the virtual machine, the flow of the tunnel establishment processing according to the first embodiment.

Step S21: The user in the user side system US of FIG. 2 inputs the certification information for the user certification into the terminal device 1. For example, a kind of the user certification includes the password certification by the user ID distinguishing the user and the password corresponding to this user ID. In the case of the password certification, the certification information is this user ID and a password corresponding to the user ID. Besides, for a kind of the user certification, there is the card certification by the user ID distinguishing the user and the ID card which stores the key information such as the public keys corresponding to this user ID. In the case of the card certification, the certification information is the user ID and the key information corresponding to the user ID. In the following description, as certification information of the card certification, the user ID and the public key corresponding to the user ID is exemplified.

In the case of the password certification, the whole administration unit 161 in FIG. 2 instructs to the display control apparatus 12, for example, to display a user ID and a password input screen to the display device 121 as a screen for certification. The display control apparatus 12 displays the user ID and the password input screen to the display device 121 in response to this display instruction. The user operates the operation device 131 and inputs the user ID and the password. The certification information acquisition unit 162 acquires an input user ID and a password, namely input certification information, through the operation control apparatus 13.

In the case of the card certification, the whole administration unit 161 instructs the display control apparatus 12 to display a screen instructing a user to insert an ID card in the card reader 141 as a screen for certification to the display device 121, for example. The display device 121 displays the instruction screen to the display screen in response to this display instruction. The user inserts the ID card in the card reader 141 in response to the display of this instruction screen. The card reader 141 reads the user ID and the public key corresponding to the user ID from the inserted ID card and outputs it to the card reader control apparatus 14. The certification information acquisition unit 162 acquires the input user ID and the public key corresponding to this user ID, namely input certification information, through the card reader control apparatus 14.

Step S22: The whole administration unit 161 in the terminal device 1 requests connection to the router device 2.

Step S23: The router device 2 receives this connection request and establishes the connection with the terminal device 1 and transmits a notice of connection completion to the terminal device 1. Specifically, when the whole administration unit 231 in the router device 2 in FIG. 4 receives the connection request, the whole administration unit 231 instructs to the connection unit 232 to establish the connection to execute two-way communication with the terminal device 1. The connection unit 232 establishes the connection to execute two-way communication with the terminal device 1 in response to this establishment instruction. This connection establishment allows two-way communication processing between the terminal device 1 and the router device 2.

Step S24: The certification information transmission unit 163 in the terminal device 1 in FIG. 2 transmits the certification information that the certification information acquisition unit 162 acquired to the router device 2.

Step S25: The certification administration unit 234 in the router device 2 in FIG. 4 receives this certification information and requests the certification of the user to the certification server device 3. Specifically, the whole administration unit 231 receives the certification information sent from the terminal device 1, and transmits it to the certification administration unit 234. The certification administration unit 234 transmits the certification information which is received to the certification server device 3 with a certification request.

Step S26: The certification server device 3 in FIG. 5, based on the certification information which is received, executes the certification of the user, and transmits the cloud access information corresponding to this certification information to the router device 2 in response to the certification request. Specifically, the whole administration unit 331 in the certification server device 3 receives the certification request and the certification information sent from the router device 2 and instructs the certification practice unit 332 to execute the certification processing. The certification executing unit 332 executes the user certification processing based on this certification information in response to the instruction.

In the case of the above password certification, the certification executing unit 332 authenticates it, based on a table (not illustrated in the figures) which stores the user ID, and the password corresponding to the user ID, of which the storage device 34 stores beforehand. Here, the certification executing unit 332, when the user ID and the password, included in the certification information which is received, are stored in this table, authenticates that a user distinguished by this user ID is a fair user. Below, what certification executing unit 332 authenticated with a fair user is described as a certification success appropriately. When this user ID and the password are not stored in this table, the certification executing unit 332 determines that the user is not a fair user. Below, what certification executing unit 332 did not authenticated with a fair user is described as a certification failure appropriately.

In the case of the above card certification, the certification executing unit 332 authenticates based on a table (not illustrated in figures) which stores the user ID and the public key corresponding to this user ID, of which the storage apparatus 34 stores beforehand. Here, the certification executing unit 332, when the user ID and the public key included in the certification information which is received are stored in the table, authenticates that a user distinguished by this user ID is a fair user. When this user ID and the public key are not stored in this table, the certification executing unit 332 determines that this user is not a fair user.

In addition, for a certification protocol, various protocols such as RADIUS (Remote Authentication Dial In User Service) certification protocol are used.

When the certification executing unit 332 executes the certification processing and authenticates that a user distinguished by the user ID included the certification information which is received is a fair user, in other words, when the certification of the user succeeds, the whole administration unit 331 executes the following processing. In other words, the whole administration unit 331 acquires the cloud access information corresponding to this user ID and instructs to the access information acquisition unit 333 to transmit the cloud access information which is acquired to the router device 2. On the other hand, the whole administration unit 331 transmits the certification failure to the router device 2, when the certification executing unit 332 determines that this user is not a fair user. In this case, the router device 2 notifies the certification failure to the terminal device 1.

The access information acquisition unit 333 acquires the cloud access information corresponding to the above user ID from the cloud access administration table T1 in FIG. 6 and the cloud service administration table T2 in FIG. 7, in response to acquisition instruction of the cloud access information.

For example, in the case that the user ID is "User-A", the access information acquisition unit 333 acquires the start/stop information "API_VR-A" of the virtual router corresponding to this user ID, the IP address "x1.x2.x3.x4" of the virtual router, the type of L2 protocol "GRE", and SaaS ID "SaaS-0" from the cloud access control table T1 in FIG. 6. Furthermore, the access information acquisition unit 333 acquires the virtual machine start/stop information "API_VM-A", the IP address "xx1.xx2.xx3.xx4" of the virtual machine, the protocol "HTTP" for connection corresponding to this SaaS ID "SaaS-0" which is acquired, with reference to the cloud service administration table T2 in FIG. 7. The access information acquisition unit 333 transmits the cloud access information which is acquired to the router device 2.

In this way, the access information acquisition unit 333 transmits the cloud access information that was defined for each of the users of the cloud service, when the certification of the user succeeds, to the router device 2.

Step S27: The router device 2 requests the start of the virtual router based on the cloud access information which is received to the datacenter DC1_1.

Specifically, the whole administration unit 231 in the router device 2 in FIG. 4 stores the cloud access information which is received into the storage apparatus 24 (referring to FIG. 3). Then, the virtual router start/stop unit 235 sets the user ID "User-A", the IP address "x1.x2.x3.x4" of the virtual router, which are stored in the storage apparatus 24 and a start instruction option as an argument in the "API_VR-A" and executes "API_VR-A" which is the start/stop information of this virtual router. The whole administration unit 231 transmits the start instruction command of the virtual router having the user ID "User-A", the IP address "x1.x2.x3.x4" and the start instruction option of the virtual router to the administration server device 7 depicted by FIG. 8 based on "API_VR-A". In addition, this API is API which is explained in FIG. 6.

When the whole administration unit 731 in the administration server device 7 receives this start instruction command, the whole administration unit 731, based on the user ID in which this start instructions command has, acquires the hardware resource quantity to assign to the virtual router corresponding to this user ID from the virtual router HW table T11 depicted by FIG. 9. In the above example, the user ID is "User-A". Therefore, the whole administration unit 731 acquires clock speed 1.0 Giga Hz of the CPU, the memory capacity 1.0 Giga byte of the memory, the storage capacity 100.0 Giga byte of the storage, the communication band 1.2 Giga bps from the virtual router HW table T11.

And the whole administration unit 731 transmits the hardware resource quantity of the virtual router which is acquired and the IP address of the virtual router, in which this start instruction command has, to the virtual router administration unit 732.

When the virtual router administration unit 732 receives the hardware resource quantity of the above virtual router and the IP address of the virtual router, the virtual router administration unit 732 selects a server device which is targeted for the start of the virtual router among the plurality of server device 4_1-server device 4_Ne. For example, for the criteria for selection of this server device, there is a standard to select the server device which is the least number of executing virtual routers.

And the virtual router administration unit 732 transmits the hardware resource quantity of the above virtual router and the IP address of the virtual router which are received in addition to the virtual router start instruction command to the server device which is selected. Here, when the virtual router administration unit 732 selects the Ne-th server device 4_Ne, This virtual router start instruction command is one example of the fourth command to instruct the start of the software to the server device.

Step S28: The server device which received the start instruction command of the virtual router starts and executes the virtual router based on the hardware resource quantity of the above virtual router and the IP address of the above virtual router which are received. And the administration server device 7 notifies a completion of the start to the router device 2.

Specifically, the hyper visor 45 (referring to FIG. 11) in the server device 4_Ne, which received the start instruction command of the virtual router, starts the virtual router having clock speed 1.0 Giga Hz of the CPU41, the memory capacity 1.0 Giga byte of the memory 43, the storage capacity 100.0 Giga byte of the storage apparatus 44 and the communication band 1.2 Giga bps of the communication apparatus 42. And the hyper visor 45 assigns above IP address "x1.x2.x3.x4" which is received to this virtual router which started.

And the hyper visor 45 lets the virtual router which started execute a program to execute the transfer process of the packet (routing processing). Here, when the hyper visor 45 started the virtual router 4vr_1, this virtual router 4vr_1 is virtual router 4vr depicted by FIG. 1. After start completion, the hyper visor 45 notifies the administration server device 7 that the start of the virtual router was completed. The whole administration unit 731 in the administration server device 7 in FIG. 8 notifies the start completion of this virtual router to the router device.

Step S29: The router device 2 requests the start of the virtual machine to the datacenter DC_1, based on the cloud access information which is received.

Specifically, when the whole administration unit 231 in the router device 2 in FIG. 4 receives a notice of start completion of the virtual router, the whole administration unit 231 instructs to the virtual machine start/stop unit 236 to execute the start instruction of the virtual machine. The virtual machine start/stop unit 236 sets the SaaS ID "SaaS-0", the IP address "xx1.xx2.xx3.xx4" of virtual machine which are corresponded to user ID"User-A" and stored in the storage apparatus 24, and a start instruction option as an argument in the "API_VM-A" and executes "API_VM-A" which is the start/stop information of this virtual machine. The whole administration unit 231 transmits the start instructions command of the virtual machine, which has the SaaS ID "SaaS-0", the IP address "xx1.xx2.xx3.xx4" of the virtual machine, and the start instruction option, to the administration server device 7 in the datacenter DC1_1 in FIG. 8, based on "API_VM-A". In addition, this API is API which is explained in FIG. 7.

When the whole administration unit 731 in the administration server device 7 receives this start instruction command, the whole administration unit 731, based on the SaaS ID of which this start instructions command has, acquires the hardware resource quantity to assign to the virtual machine corresponding to this SaaS ID from the virtual machine HW table T12 in FIG. 10. Furthermore, the whole administration unit 731 acquires the name of the software resources, of which this virtual machine executes, from the virtual machine HW table T12 in FIG. 10.

The SaaS ID is "SaaS-0" in the above example. Therefore, the whole administration unit 731 in FIG. 8 acquires clock speed 2.0 Giga Hz of the CPU, memory capacity 2.0 Giga byte of the memory, the storage capacity 100.0 Giga byte of the storage apparatus, communication band 1.0 Giga bps as the hardware resource quantity of the virtual machine corresponding to the "SaaS-0" from the virtual machine HW table T12. Furthermore, the whole administration unit 731 acquires OS (Operating System) "OS0", and application "App0$a$", "App0$b$", as the name of the software resources of which this virtual machine executes.

And the whole administration unit 731 transmits the hardware resource quantity which is acquired and the name of software resources which is acquired, and the IP address of the virtual machine, of which this start instructions command has, to the virtual machine administration unit 733.

When the virtual machine administration unit 733 receives the hardware resource quantity of the above virtual machine, etc., the virtual machine administration unit 733 selects a server device which is targeted for the start of the virtual machine among the plurality of server device 4_1-server device 4_Ne. For example, for the criteria for selection of this server device, there is a standard to select the server device which is the least number of executing virtual machines.

And the virtual machine administration unit 733 transmits the hardware resource quantity of the above virtual machine, the name of the application, and the IP address of the virtual machine which are received in addition to the virtual machine start instructions command to the server device which is selected. Here, when the virtual machine administration unit 733 selects the Ne-th server device 4_Ne. The virtual machine start instruction command is one example of the fourth command to instruct the start of the software to the server device.

Step S30: The server device, which received the start instruction command of the virtual machine, starts and executes the virtual machine based on the hardware resource quantity of the above virtual machine and the IP address of the virtual machine which are received. And the administration server device 7 notifies a completion of the start to the router device 2.

Specifically, the hyper visor 45 (referring to FIG. 11) in the server device 4_Ne, which received the start instruction command of the virtual machine, starts an virtual machine having clock speed 2.0 Giga Hz of the CPU 41, memory capacity 2.0 Giga byte of the memory 43, storage capacity 100.0 Giga byte of the storage apparatus 44 and the communication band 1.0 Giga bps of a communication apparatus 42, based on the hardware resource quantity of the above virtual machine which is received.

And the hyper visor 45 assigns above the IP address "x1.x2.x3.x4" which is received to this virtual machine which started. Furthermore, the hyper visor 45 retrieves the application program corresponding to the name of the application of the virtual machine from the storage apparatus 44, and develops it in the memory 43 and executes this application. Here, when the hyper visor 45 started the virtual machine 4vm_1, this virtual machine 4vm_1 is the virtual machine 4vm in FIG. 1. After start completion, the hyper visor 45 notifies the administration server device 7 that the start of the virtual machine was completed. The whole administration unit 731 in the administration server device 7 in FIG. 8 notifies the start completion of this virtual machine to the router device 2 in FIG. 4.

Step S31: The tunnel establishment unit 237 in the router device 2 establishes the tunnel between the router device 2 and the executing virtual router based on L2 protocol corresponding to the ID of an authorized user.

For example, in the case that the ID of the authorized user is "User-A", according to the cloud access control table T1 in FIG. 6, the L2 protocol corresponding to this user ID is GRE. In this case, the tunnel establishment unit 237 in the router device 2 sets IP address of the own device, and the IP address (x1.x2.x3.x4) of the executing virtual router 4vr_1 (referring to FIG. 11) to the memory 23 (referring to FIG. 3) of the own device. Furthermore, the tunnel establishment unit 237 in the router device 2 transmits the IP address of the own device and the L2 protocol type "GRE" to this virtual router 4vr_1. This virtual router 4vr_1 sets the IP address of router device 2 which is received in the memory area assigned to the virtual router 4vr_1. When the setting process of these IP addresses is finished, the tunnel establishment unit 237 in the router device 2 and this virtual router 4vr_1 execute data communication by executing the encapsulation of the IP packet based on the GRE protocol. In other words, based on L2 protocol corresponding to the ID of an authorized user, the tunnel between the router device 2 and the executing virtual router is established. And the routing unit 233 in the router device 2 executes data communication processing between the router device 2 and the virtual router 4vr_1.

Step S32: The whole administration unit 231 in the router device 2 notifies the terminal device 1 that the tunnel establishment was completed. In this time, the whole administration unit 231 notifies the IP address of the virtual machine which started to the terminal device. When the whole administration unit 161 in the terminal device 1 in FIG. 2 receives the notice of tunnel establishment, the whole administration unit 161 instructs the display control apparatus 12 to display a tunnel establishment notice screen. The display control apparatus 12 displays a tunnel establishment notice screen to the display device 121 in response to the instruction. Afterward, the access unit 164 in the terminal device 1 accesses the virtual machine 4vm_1 via the router device 2, the communication network Nt, the gateway device 5, the router device 6, and the virtual router 4vr_1, by transmitting a packet, of which the IP address of a virtual machine notified is a destination address, to the router device 2. As a result, it is possible that the user uses the cloud service that this virtual machine 4vm_1 provides. When the routing unit 233 in the router device 2 receives a packet transmitted by the terminal device 1, the routing unit 233 refers to the MAC (Media Access Control) address of the terminal device which is stored on the header unit of this packet. And, the routing unit 233, when the MAC address is a MAC address of the terminal device 1 of which the above user uses, transmits this packet to the communication network Nt which is an outside network, in other words, execution of cancelling of the MAC filtering. After finish of the process in FIG. 13, when the other user (for example, the user ID "User-B") inputs a certification information of the other user into a terminal device (for example, the terminal device 1_Nb) except the terminal device which is explained in FIG. 13, each steps in FIG. 13 are performed. As a result, it is possible that the other user uses the cloud service of the other user.

When this user stops the use of the cloud service, the following processing is executed. For example, the user operates the operation device 131 with the terminal device 1 in FIG. 2 and performs the stop instruction operation of the cloud service. In this time, the user inputs the certification information having the user ID together. The operation control apparatus 13 transmits the command, which indicates the stop instruction operation having been executed, to the whole administration unit 161 in response to this stop instruction operation. The whole administration unit 161, when received this command, transmits the user ID to the router device 2 and transmits the second command to instruct the stop of the cloud service to the router device 2. In the case of the above example, this user ID is "User-A".

When the whole administration unit 231 in the router device 2 in FIG. 4 receives this user ID "User-A" and the second command, the whole administration unit 231 instructs to the virtual machine start/stop unit 236 to stop an virtual machine of SaaS ID corresponding to this user ID. The virtual machine start/stop unit 236 sets the SaaS ID "SaaS-0" and the stop instruction option corresponding to this user ID "User-A" as an argument in the "API_VM-A", in response to this stop instruction, and executes the "API_VM-A" which is the start/stop information of the virtual machine of SaaS ID "SaaS-0" corresponding to this user ID "User-A" and is stored in the storage apparatus 24 (referring to FIG. 3). The virtual machine start/stop unit 236 transmits the stop instruction command of the virtual machine having the SaaSID "SaaS-0" and the stop instruction option to the administration server device 7 in FIG. 8, based on the "API_VM-A". In addition, for example, this API is "http://www.hogehoge.com/cloud/vm/SaaS-0/Off". This API means to instruct the administration server device 7 in FIG. 8 appointed in "www.hogehoge.com" to stop the execution of the virtual machine ("vm") of the SaaS ID "SaaS-0".

When the whole administration unit 731 in the administration server device 7 receives this stop instruction command, the whole administration unit 731 instructs a stop of executing the virtual machine 4vm_1 of SaaS ID "SaaS-0" of which this stop instruction command has, to the server device 4e (referring to FIG. 11). The hyper visor 45 in the server device 4e stops the execution of the virtual machine 4vm_1 in response to the instruction.

Then, the whole administration unit 231 in the router device 2 in FIG. 4 instructs the virtual router start/stop unit 235 to stop the virtual router corresponding to this user ID. The virtual router start/stop unit 235 sets this user ID "User-A" and the stop instruction option as an argument in the "API_VR-A", in response to this stop instruction, and executes "API_VR-A" which is the start/stop information of the virtual router corresponding to this user ID "User-A" and is stored in the storage apparatus 23 (referring to FIG. 3).

The virtual router start/stop unit 235 transmits the stop instruction command of the virtual router having the user ID "User-A" and the stop instruction option to the administration server device 7 in FIG. 8, based on the "API_VR-A". In addition, for example, this API is "http://www.hogehoge.com/cloud/vr/User-A/Off". This API means to instruct the administration server device 7 in FIG. 8 appointed in "www.hogehoge.com" to stop the execution of the virtual router ("vr") of the user ID "User-A".

When the whole administration unit 731 in the administration server device 7 receives this stop instruction command, the whole administration unit 731 instructs a stop of the execution of the virtual router 4vr_1 corresponding to the user ID, of which this stop instruction command has, to the server device 4e (referring to FIG. 11). The hyper visor 45 in the server device 4e stops the execution of the virtual router 4vr_1 in response to the instruction.

As described above, the third command which instructs the stop of cloud service includes the stop instruction command of the virtual machine in which the virtual machine start/stop unit 236 transmits to the administration server device 7, and the stop instruction command of the virtual router in which the virtual router start/stop unit 235 transmits to the administration server device 7.

According to the router device of the embodiment, it is possible that a plurality of users simultaneously use each cloud service (information processing service). In the case of an example of the cloud access administration table T1 in FIG. 6 and the cloud service administration table T2 in FIG. 7, it is possible that the user distinguished by the user ID "User-A" uses the cloud service that is distinguished by the SaaS ID "SaaS-0", by only inputting the certification information of this user into the terminal device. Similarly it is possible that the user distinguished by the user ID "User-B" uses the cloud service that is distinguished by the SaaS ID "SaaS-1", by only inputting the certification information of this user into the terminal device.

It is possible that the plurality of users uses the cloud service of user oneself by simple operation without performing complicated operation, because the user only inputs the certification information into the terminal device when the user uses the cloud service for each of users. As a result, the convenience of the user improves.

In addition, because a certification server device executing certification processing manages the access information for the cloud service, it is possible that the router device acquires the access information for the cloud service with certification processing. Therefore, it is not need to execute the authentication process and the acquisition process of access information by a different device. In addition, when adding a user using cloud service newly, it is performed to add only the access information of this user to the cloud access administration table T1 in FIG. 6 and the cloud service administration table T2 in FIG. 7 that the certification server device administrates newly. Therefore, it is possible to simplify the additional processing of the user.

Besides, the router device 2 may store the first information and the second information into the storage apparatus 24. Specifically, the storage apparatus 24 in the router device 2 stores the cloud access administration table T1 in FIG. 6 and the cloud service administration table T2. In this case, the whole administration unit 231 in the router device 2 receives identification information to distinguish the user of the information processing service from the terminal device 1, and acquires (extracts) the first information and the second information depending on the identification information. For example, this identification information is a user ID.

Specifically, when the whole administration unit 231 in the router device 2 receives a user ID included in the certification information, the whole administration unit 231 acquires the cloud access information corresponding to the above user ID from the cloud access administration table T1 in FIG. 6 and the cloud service administration table T2 in FIG. 7.

For example, in the case that the user ID is "User-A", the whole administration unit 231 acquires the start/stop information "API_VR-A" of the virtual router, the IP address "x1.x2.x3.x4" of the virtual router, L2 protocol type "GRE", SaaS ID "SaaS-0" corresponding to this user ID from the cloud access administration table T1 in FIG. 6. Furthermore, the whole administration unit 231 acquires the virtual machine start stop information "API_VM-A", the IP address "xx1.xx2.xx3.xx4" of the virtual machine, and the protocol "HTTP" for connection corresponding to this SaaS ID "SaaS-0" which is acquired with reference to the cloud service administration table T2 in FIG. 7.

And the router device 2 requests the start of the virtual router based on the cloud access information which is acquired to the datacenter DC1_1. The explanation of the start request of this virtual router is omitted, because the explanation is described in detail in the step S27 of FIG. 13. Furthermore, the router device 2 requests the start of the virtual machine based on the cloud access information which is acquired to the datacenter DC1_1. The explanation of the start request of this virtual machine is omitted, because the explanation is described in detail in the step S29 of FIG. 13.

In this way, because the router device 2 stores the first information and the second information and acquires the cloud access information of the user, a certification server device becomes needless. As a result, it is possible to save the hardware resources. In addition, it is possible to shorten acquisition time of the cloud access information, because communication processing with the router device 2 and the certification server device 3 is not executed.

(Second Embodiment)

In the first embodiment, one certification server device is installed outside of the first datacenter DC1_1-nth datacenter DC1_n as illustrated by FIG. 1. However, the certification server device may be installed for each of datacenters. In this way, because the certification server device is installed for each of datacenters, the management of the certification server device becomes easy for a cloud service provider.

(Information Processing System)

Figure 14:
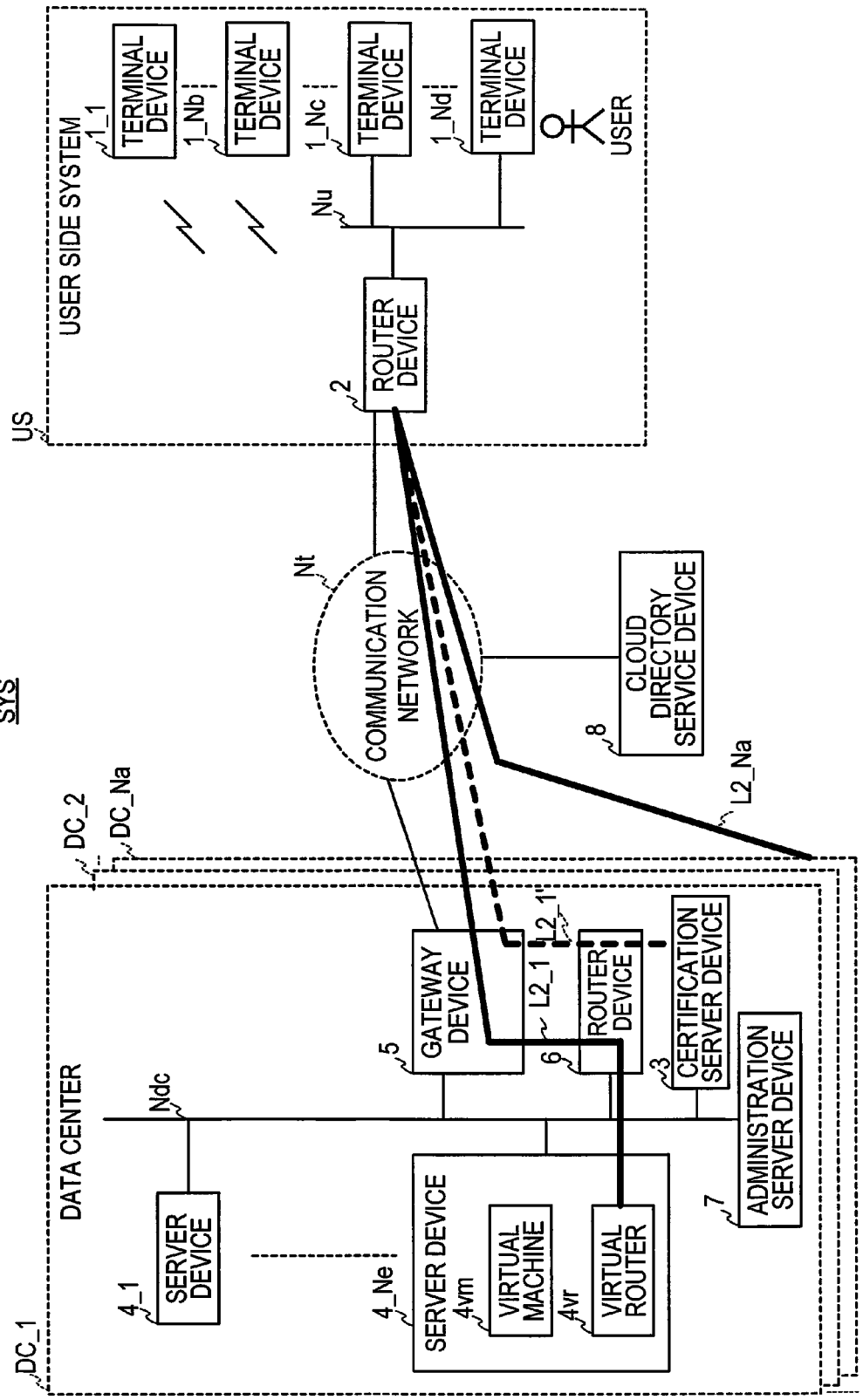
FIG. 14 is a hardware block diagram explaining an example of information system SYS according to the second embodiment.

FIG. 14 is a hardware block diagram explaining an example of information system SYS according to the second embodiment. In FIG. 14, the certification server device 3 is provided for the datacenter DC1_1 and the cloud directory service device 8 is provided by replacing with the certification server device 3 in FIG. 1 more. The cloud directory service device 8 is one example of the third device which stores the third information for the router device 2 to connect with the certification server device 3. In FIG. 14, the dotted line indicated by mark L2_1' represents L2 tunnel established between the router device 2 in the user side system US and the certification server device 3 in the datacenter DC1_1. In addition, this L2 tunnel will be explained in FIG. 20.

Figure 15:
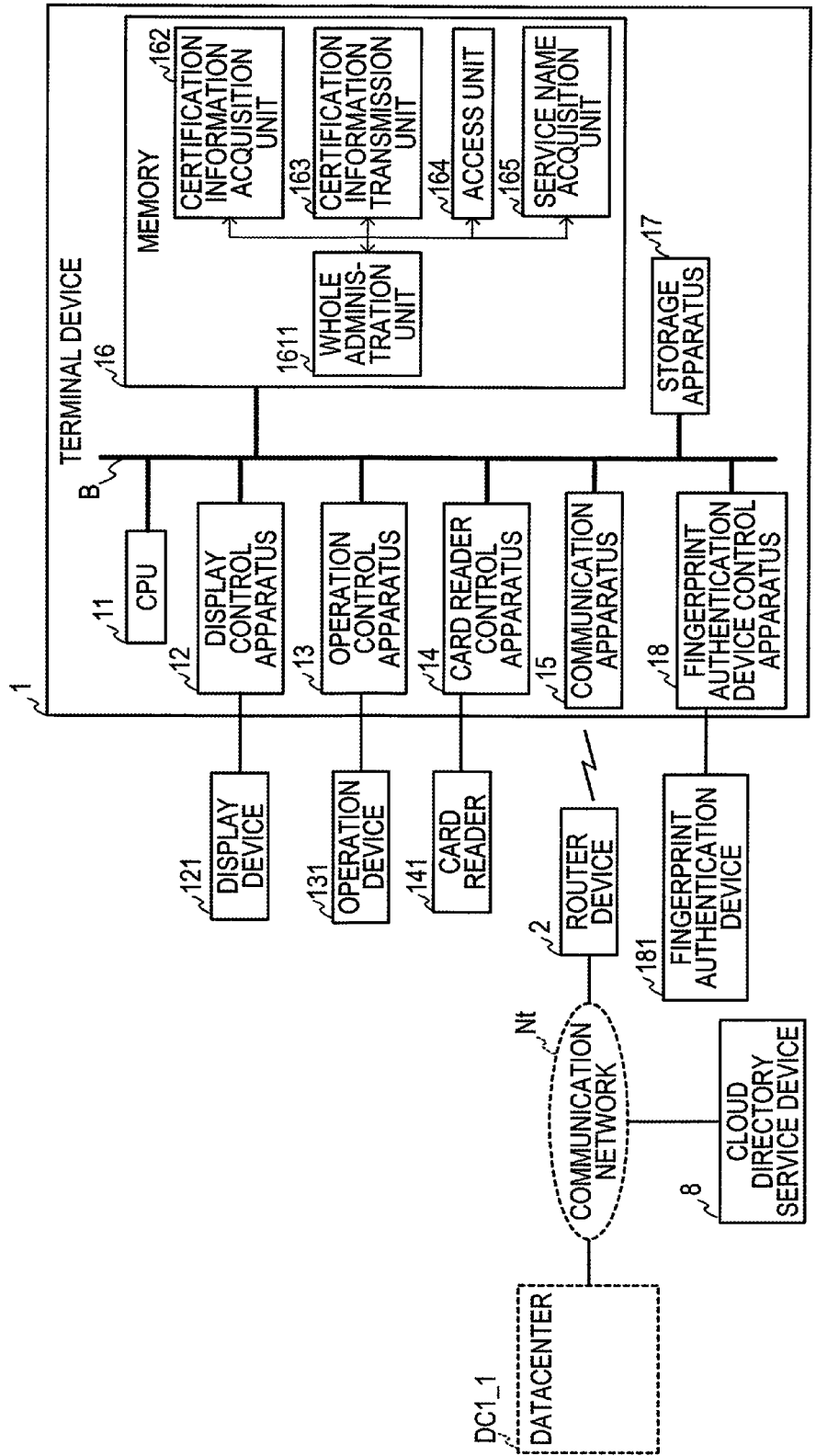
FIG. 15 is a hardware block diagram of the terminal device in FIG. 14.

FIG. 15 is a hardware block diagram of the terminal device in FIG. 14. The terminal device 1 in FIG. 15 is added a fingerprint authentication device 181 having an optical fingerprint reading function and a fingerprint authentication control apparatus 18 to control the fingerprint authentication device 181 to the terminal device 1 in FIG. 1. Furthermore, the memory 16 is added service name acquisition unit 165 which acquires a cloud service name. The whole administration unit 1611 in the memory 16 manages the service name acquisition unit 165 in addition to the function of whole administration unit 161 in FIG. 1.

Figure 16:
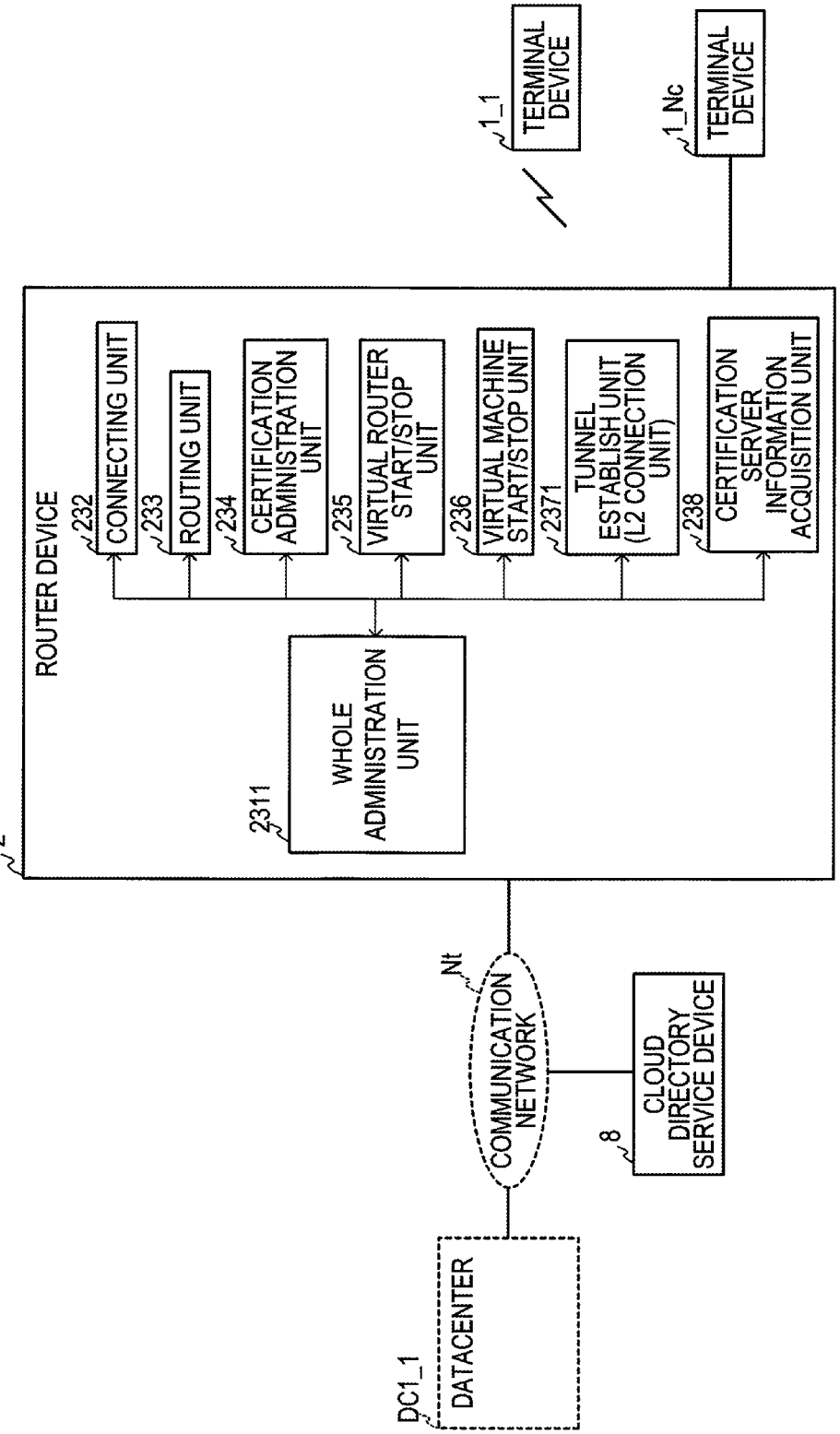
FIG. 16 is a block diagram of the software module of which the router device 2 in FIG. 14 executes.

FIG. 16 is a block diagram of the software module of which the router device 2 in FIG. 14 executes. The router device 2 in FIG. 16 is added certification server information acquisition unit 238, which acquires certification server information needed to access the certification server device 3 in FIG. 14, to the router device 2 in FIG. 4. The tunnel establishment unit 2371 has a function to establish a tunnel between the router device 2 and the certification server device 3 in addition to the tunnel establishment function in FIG. 4. The whole administration unit 2311 has a function to manage the certification server information acquisition unit 238 in addition to the function of whole administration unit 231 in FIG. 4.

Figure 17:
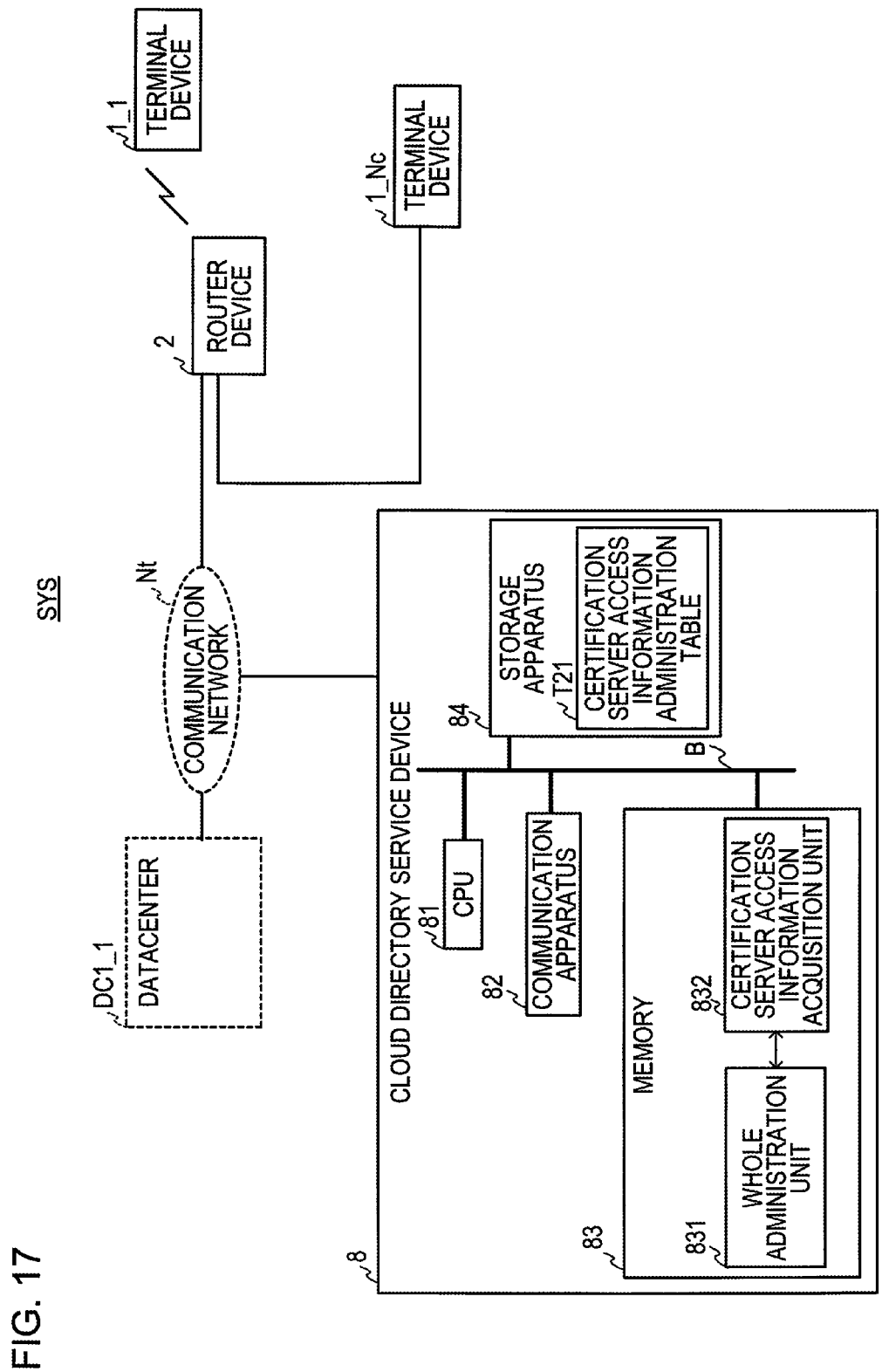
FIG. 17 is a hardware block diagram of the cloud directory service device 8 in FIG. 14.

FIG. 17 is a hardware block diagram of the cloud directory service device 8 in FIG. 14.

The cloud directory service device 8 has a CPU 81 and a communication apparatus 82, a memory 83 and a storage apparatus 84 which are connected mutually through bus B, for example.

The CPU 81 is an arithmetic processor which controls the whole of the cloud directory service device 8. The communication apparatus 82 is, for example, NIC, and connects to the communication network Nt in FIG. 14 by a cable and performs the communication with various devices connecting to this communication network Nt.

The memory 83 stores data which is processed in various information processing that the CPU 81 executes and various programs, temporarily.

The whole administration unit 831 in the memory 83 manages various processing that the cloud directory service device 8 executes. The whole administration unit 831 manages, for example, the certification server access information acquisition unit 832 and executes the transmission and reception process of the communication packet to a device connecting with the communication apparatus 82. The certification server access information acquisition unit 832 acquires need information when accessing the certification server device 3, from the certification server access information administration table T21 in the storage apparatus 84. The information (called as the certification server access information appropriately as follows) that is needed when accessing this certification server device 3, is the third information in order for the router device 2 to connect with the certification server device 3.

The whole administration unit 831 and the certification server access information acquisition unit 832 are so-called programs. And these programs are stored to the storage apparatus 84, for example. The CPU 81 retrieves these programs from the storage apparatus 84 at the time of start, and develops it in the memory 83 and functionalizes these programs as a software module.

The storage apparatus 84 is a magnetic memory apparatus or a nonvolatile storage apparatus, for example. The storage apparatus 84 stores the above program and various data. Furthermore, the storage apparatus 84 stores the certification server access information administration table T21 having information needed to access the certification server device 3.

Figure 18:
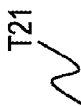
FIG. 18 is a diagram indicating an example of the certification server access information management table T21 which is represented by FIG. 17.

FIG. 18 is a diagram indicating an example of the certification server access information administration table T21 which is represented by FIG. 17. The certification server access information administration table T21 in FIG. 18 has a cloud service name column, the IP address column of the certification server, L2 protocol column and a certification protocol column.

The cloud service name column stores a cloud service name to distinguish the datacenter which provides the cloud service that a user accesses. The IP address column of the certification server stores the IP address of the certification server device installed in this datacenter. The L2 protocol column stores the type of the protocol to establish a tunnel between the router device 2 and the certification server device 3. The certification protocol column stores the type of the certification protocol when the certification server device 3 performs the user certification.

In FIG. 18, the cloud service name column stores three cloud name, that is, "Cloud-A", "Cloud-B", and "Cloud-C". And the IP address column of the certification server stores three IP addresses, that is, "xxx.xxx.xxx.xxx", "yyy.yyy.yyy.yyy", and "zzz.zzz.zzz.zzz" as the IP addresses of the certification server device corresponding to each of above cloud service name. The L2 protocol column stores "GRE", "OpenVPN", and "L2TP" as the type of the protocols corresponding to each above cloud service name. And the certification protocol column stores "pass phrase", "IC card", and "fingerprint authentication" as the type of the certification protocol corresponding to each above cloud service name.

This "pass phrase" performs the user certification based on the user ID and the password corresponding to the user ID as illustrated by FIG. 13. The "smart card" performs the user certification based on a user identification card as illustrated by FIG. 13. The fingerprint authentication performs the user certification by reading the fingerprint of the user and based on this fingerprint which is read.

Figure 19:
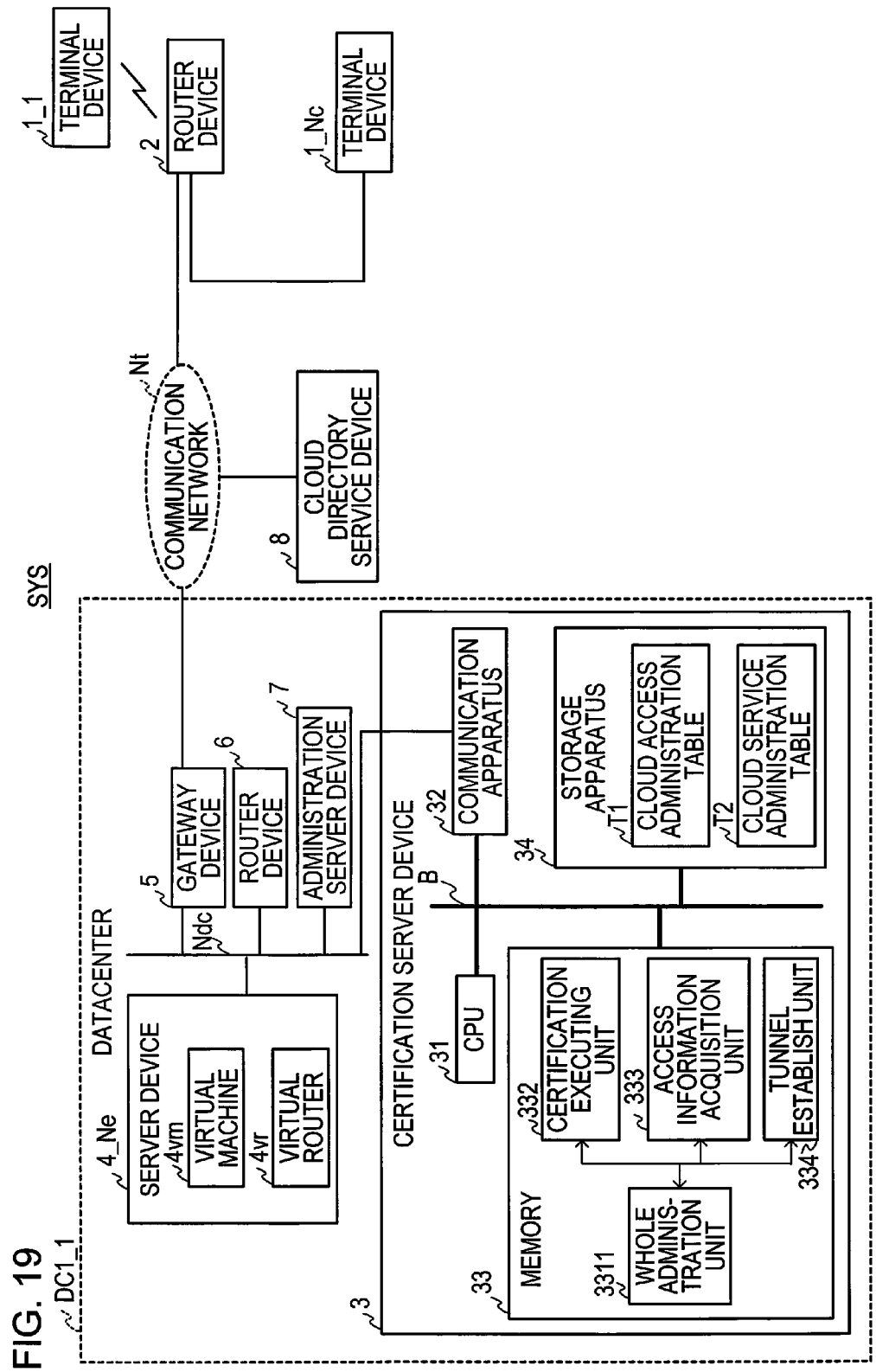
FIG. 19 is a hardware block diagram of the certification server device 3 in FIG. 14.

FIG. 19 is a hardware block diagram of the certification server device 3 in FIG. 14. The certification server device 3 in FIG. 19 is added the tunnel establishment unit 334 to the certification server device 3 in FIG. 5.

(Flow of the Acquisition Process of Information Having Cloud Access Information)

The flow of the processing, which acquires the cloud access information from the certification server device 3 installed in the datacenter, according to the second embodiment will be explained based on FIG. 20 while referring to FIG. 14-FIG. 19.

Figure 20:
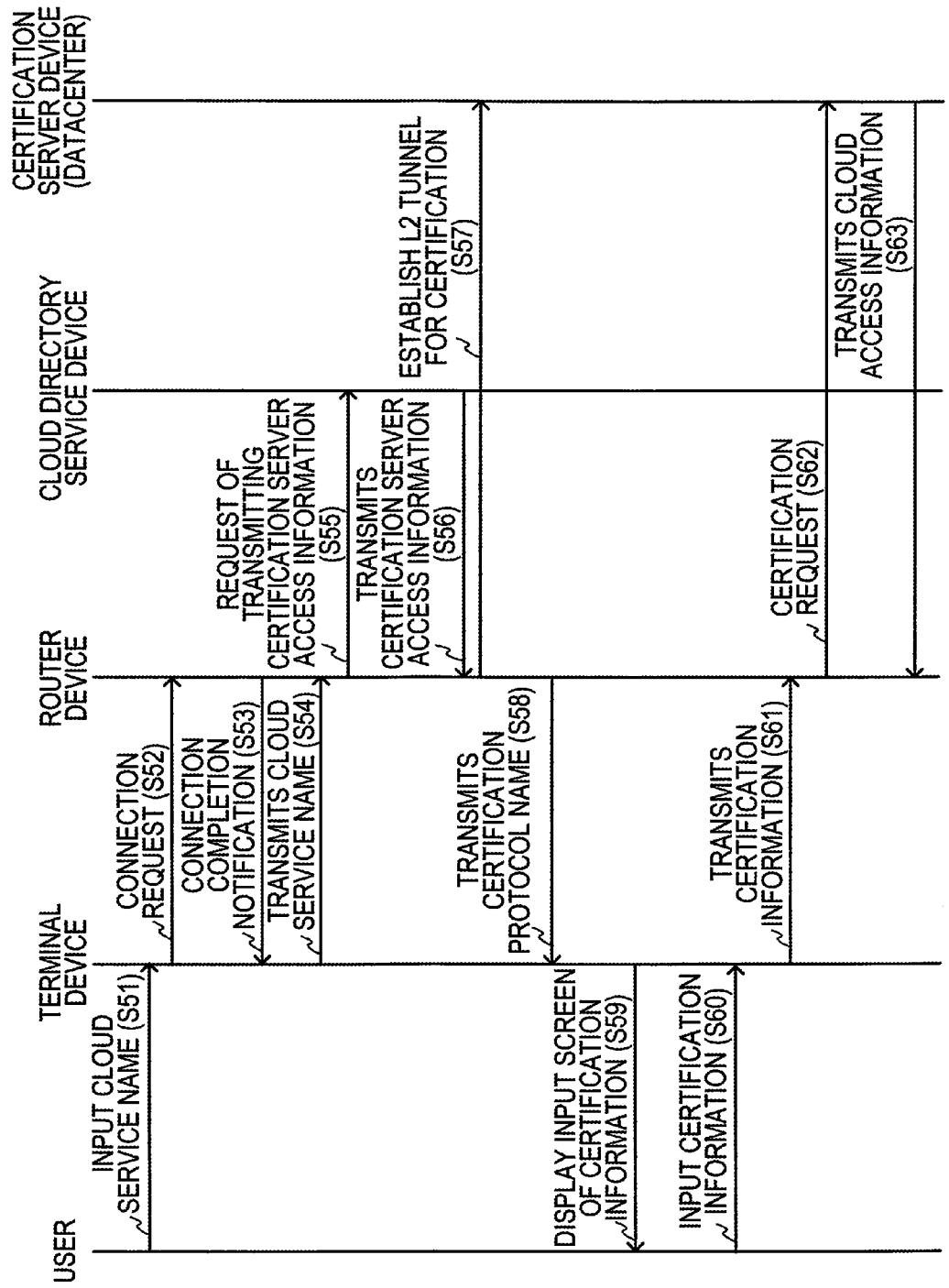
FIG. 20 is a diagram explaining a flow of the processing to acquire the cloud access information from the certification server device 3 installed in the datacenter.

FIG. 20 is a diagram explaining a flow of the processing to acquire the cloud access information from the certification server device 3 installed in the datacenter.

Step S51: The user in the user side system US in FIG. 14 inputs the name of the cloud service that the user wants to access into the terminal device 1. Specifically, the user inputs this cloud service name through the operation device 131 in the terminal device 1 in FIG. 15. The service name acquisition unit 165 acquires this cloud service name through the operation control apparatus 13.

Step S52: The whole administration unit 1611 in the terminal device 1 requests the connection to the router device 2 in FIG. 16.

Step S53: The router device 2 receives this connection request and establishes the connection with the terminal device 1 and transmits a notice of connection completion to the terminal device 1. Specifically, the whole administration unit 2311 in the router device 2 in FIG. 16, when receiving the connection request, instructs the connection unit 232 to establish the connection to execute two-way communication with the terminal device 1. The connection unit 232 establishes the connection to execute two-way communication with the terminal device 1 in response to this establishment. This connection establishment allows the two-way communication processing between the terminal device 1 and the router device 2.

Step S54: The service name acquisition unit 165 in the terminal device in FIG. 15 transmits the cloud service name which is acquired to the router device 2 in FIG. 16.

Step S55: The certification server information acquisition unit 238 in the router device 2 receives the cloud service name sent from the terminal device 1 and performs a certification server access information transmission request to the cloud directory service device 8. Specifically, the whole administration unit 2311 receives the cloud service name sent from the router device 2 and transmits it to the certification server information acquisition unit 238 in FIG. 16. The certification server information acquisition unit 238 transmits the certification server access information transmission request and the cloud service name which is received to the cloud directory service device 8. This certification server access information transmission request is a transmission request of the third information.

Step S56: The cloud directory service device 8 in FIG. 17 transmits the certification server access information corresponding to the cloud service name which is received to the router device 2 in response to this transmission request. Specifically, the whole administration unit 831 in the cloud directory service device 8, when receiving the cloud service name, instructs the certification server access information acquisition unit 832 to acquire the certification server access information corresponding to this cloud service name. The certification server access information acquisition unit 832 acquires the certification server access information corresponding to this cloud service name in response to the instruction from the certification server access information administration table T21 in FIG. 18.

For example, when a cloud service name input in step S51 is "Cloud-A", the certification server access information acquisition unit 832 acquires the IP address "xxx.xxx.xxx.xxx" of the certification server, L2 protocol type "GRE", and the certification protocol type "pass phrase" corresponding to this cloud service name, from the certification server access information administration table T21 in FIG. 18. And the certification server access information acquisition unit 832 transmits the certification server access information which is acquired to the router device 2.

Step S57: The router device 2 establishes the L2 tunnel for certification between the router device 2 and the certification server device, depending on the type of the L2 protocol in the certification server access information which is received. Specifically, the whole administration unit 2311 in the router device 2 in FIG. 16, when receiving the certification server access information, transmits the IP address of the certification server device and the type of the L2 protocol included in this access information to the tunnel establishment unit 2371. And the tunnel establishment unit 2371 accesses this certification server device based on the IP address of this certification server device and establishes the L2 tunnel for certification between the router device 2 and this certification server device based on the L2 protocol which is received.

In the above example, the IP address of the certification server device was "xxx.xxx.xxx.xxx", and the type of L2 protocol was "GRE". Here, when the certification server device of this IP address is the certification server device 3 in FIG. 19, the tunnel establishment unit 2371 in the router device 2 in FIG. 16 transmits the IP address of the own device and the L2 protocol type "GRE" to the certification server device 3. The whole administration unit 3311 in this certification server device 3 receives the IP address of the router device 2 and the type of L2 protocol, and transmits it to the tunnel establishment unit 334. The tunnel establishment unit 334 receives the IP address of this router device 2, and sets it in the memory 33. When the setting process of these IP addresses is finished, the tunnel establishment unit 2371 in the router device 2 and the tunnel establishment unit 334 in the certification server device 3 execute data communication by performing the encapsulation of the IP packet based on the GRE protocol. In other words, based on the L2 protocol corresponding to the cloud service name, a tunnel between the router device 2 and the certification server device 3 is established. And the routing unit 233 in the router device 2 executes data communication processing between the router device 2 and the certification server device 3. In this way, the tunnel establishment unit 2371 connects with the certification server device 3 based on the certification server access information which is received.

Step S58: The whole administration unit 2311 in the router device 2 in FIG. 6 transmits the certification protocol included in the certification server access information which is received to the terminal device 1. In the above example, this certification protocol is "pass phrase".

Step S59: The terminal device 1 in FIG. 15 displays an input screen of the certification information corresponding to the certification protocol which is notified. Specifically, the whole administration unit 1611 in FIG. 15 instructs the display control apparatus 12 to display the user ID and the password input screen to the display device 121 when the certification protocol which is notified is a pass phrase. The display control apparatus 12 displays the user ID and the pass word input screen to the display device 121 in response to this display instruction.

In addition, when a certification protocol is "IC card", the whole administration unit 1611 instructs the display control apparatus 12 to display an instruction screen instructing a user to insert the ID card in the card reader 141 to the display device 121. The display control apparatus 12 displays the instruction screen to the display device 121 in response to this display instruction. Besides, when a certification protocol is "fingerprint authentication", the whole administration unit 1611 instructs the display control apparatus 12 to display a screen which instructs to input a user ID and a screen which instructs to touch the finger (fingerprint part) of the user to a fingerprint reading unit in the fingerprint authentication device 181. The display control apparatus 12 displays these instruction screens to the display device 121 in response to the instruction.

Step S60: The user inputs the certification information into the terminal device 1 depending on these instruction screens. Specifically, when the display device 121 displays the user ID and the password input screen, the user operates the operation device 131 and inputs the user ID and the password. The certification information acquisition unit 162 acquires the input user ID and password through the operation control apparatus 13. When the display device 121 displays the instruction screen instructing the user to insert the ID card in the card reader 141, the user inserts the ID card in the card reader 141. The card reader 141 reads the user ID and the public key corresponding to the user ID from an inserted ID card and outputs it to the card reader control apparatus 14. The certification information acquisition unit 162 acquires the input user ID and the public key corresponding to this user ID, namely input certification information, through the card reader control apparatus 14.

When the display device 121 displays a screen to instruct to touch the finger of the user with the fingerprint reading unit in the fingerprint authentication device 181 with the input screen of the user ID, the user operates the operation device 131 and inputs the user ID and touches a finger with the fingerprint reading unit in the fingerprint authentication device 181 more. The fingerprint authentication device 181 reads the fingerprint of this user and executes predetermined image processing and outputs it to the fingerprint authentication device control apparatus 18 as a fingerprint image. The certification information acquisition unit 162 acquires this fingerprint image through the fingerprint authentication device control apparatus 18. Furthermore, the certification information acquisition unit 162 acquires the input user ID through the operation control apparatus 13. In other words, the certification information acquisition unit 162 acquires the fingerprint image and the user ID as certification information.

Step S61: The certification information transmission unit 163 in FIG. 2 transmits the certification information of which the certification information acquisition unit 162 acquires, to the router device 2.

Step S62: The certification administration unit 234 in FIG. 16 receives this certification information and requests a certification request to the certification server device 3. Specifically, the whole administration unit 2311 receives the certification information sent from the terminal device 1 and transmits it to the certification administration unit 234. The certification administration unit 234 transmits the certification information which is received to the certification server device 3 with a certification request. In addition, this transmission is executed via the L2 certification tunnel which has been already established.

Step S63: The certification server device 3 in FIG. 19, based on the certification information which is received, executes certification processing, and transmits the cloud access information corresponding to this certification information to the router device 2 in response to the certification request. Specifically, the whole administration unit 3311 in the certification server device 3 receives the certification request and the certification information sent from the router device 2 and instructs the certification execution unit 332 to execute the certification processing. The certification execution unit 332 executes the user certification processing based on this certification information in response to the instruction.

The explanation of processing in case of the above password certification and the processing in case of the above card certification are omitted, because it was explained in the step S26 of FIG. 13. In the case of the fingerprint authentication, the certification server device 3 authenticates it based on a table (not illustrate in figures) which stores the user ID and the fingerprint image corresponding to the user ID in the storage apparatus 34. Here, when the user ID and the fingerprint image included in the certification information which is received are stored in this table, the certification execution unit 332 authenticates that a user distinguished by this user ID is a fair user (user certification success).

When the certification execution unit 332 executes the certification processing and authenticates that a user distinguished by the user ID included in the certification information which is received is a fair user, the whole administration unit 3311 executes the following processing. That is, the whole administration unit 3311 instructs the access information acquisition unit 333 to acquire the cloud access information corresponding to this user ID and transmits the cloud access information which is acquired to the router device 2. On the other hand, when the certification execution unit 332 determines that this user is not a fair user, the whole administration unit 3311 transmits the certification failure to the router device 2. In this case, the router device 2 notifies the certification failure to the terminal device 1.

The access information acquisition unit 333 acquires the cloud access information corresponding to the above user ID in response to acquisition instruction of the cloud access information from the cloud access administration table T1 in FIG. 6 and the cloud service administration table T2 in FIG. 7.

The access information acquisition unit 333 transmits the cloud access information which is acquired to the router device 2. In addition, more explanation about the acquisition process of cloud access information is omitted, because it was explained in the step S26 of FIG. 13.

The router device 2 executes the start request of the virtual router which is explained in step S27 of FIG. 13, the start request of the virtual machine which is explained in step S29, and the L2 tunnel establishment processing which is explained in step S31.

According to the present embodiment, it is possible to install the certification server device which administrates the cloud access information within the datacenter. Therefore, the administration of the device becomes easy for a service provider, because it is possible to change the configuration of each device in the information system flexibly.

In addition, a virtual machine starting in the server device 4_Ne may execute the function that the certification server device 3 which is explained in FIG. 19 executes. In this case, the cloud access administration table T1 and the cloud service administration table T2 are stored in the storage apparatus in the server device 4_Ne. In addition, the server device 4_Ne starts a virtual router which controls the data output from this virtual machine, and the data input to this virtual machine. In this case, the router device 2 in FIG. 16 establishes the L2 tunnel for certification between the router device 2 and this virtual router. In this way, because it prevents to install a new device by realizing the function that the certification server device 3 executes with a virtual machine, new cost of the device does not occur, thereby it is economical.

(Third Embodiment)

In the first and the second embodiment, a case that a single user uses a single cloud service is explained. In the third embodiment, when the first user uses the first cloud service and the second user uses the cloud service same as the cloud service that the first user uses, the processing of the router device will be explained. Furthermore, the process of the router devices, when the first and second users stopped the use of this cloud service, will be explained. In other words, in the third embodiment, a case, when a plurality of users use at the same time single cloud service, will be explained.

Below, the outline according to the third embodiment will be explained while exemplifying the information system SYS in FIG. 1 and referring to FIG. 6, FIG. 7, FIG. 9 appropriately. Here, the user A, which is distinguished by the user ID "User-A" (referring to FIG. 6), uses the cloud service that the datacenter DC1_1 provides through the terminal device 1_1. This cloud service is a cloud service which is distinguished by SaaS ID "SaaS-0" (referring to FIG. 7). In this case, as explained by FIG. 13, the router device 2 instructed the administration server device 7 to start the virtual machine (cloud service) corresponding to the "SaaS-0". In addition, the virtual machine corresponding to the "SaaS-0" starts after the instruction.

Afterward, the user C, which is distinguished by the user ID "User-C" (referring to FIG. 6), uses the virtual machine of which the datacenter DC1_1 provides through the terminal device 1_Nb. This virtual machine is the virtual machine distinguished by the SaaS ID "SaaS-0" (referring to FIG. 7). In other words, this virtual machine is a virtual machine same as the virtual machine of which the user A uses.

In this case, the router device 2 does not instruct the administration server device 7 to start the virtual machine corresponding to the "SaaS-0". On the other hand, the router device 2 transmits the packet to this virtual machine without filtering the packet to this virtual machine of which the terminal device 1_Nb, in which the user C uses, transmits. In other words, the router device 2 admits the communication with the virtual machine (software) through the established tunnel in the terminal device 1_Nb of the user C.

And when the user A and the user C stop the use of this SaaS in the state that the user A and the user C use this virtual machine, the router device 2 instructs the stop of this virtual machine to the administration server device 7.

Figure 21:
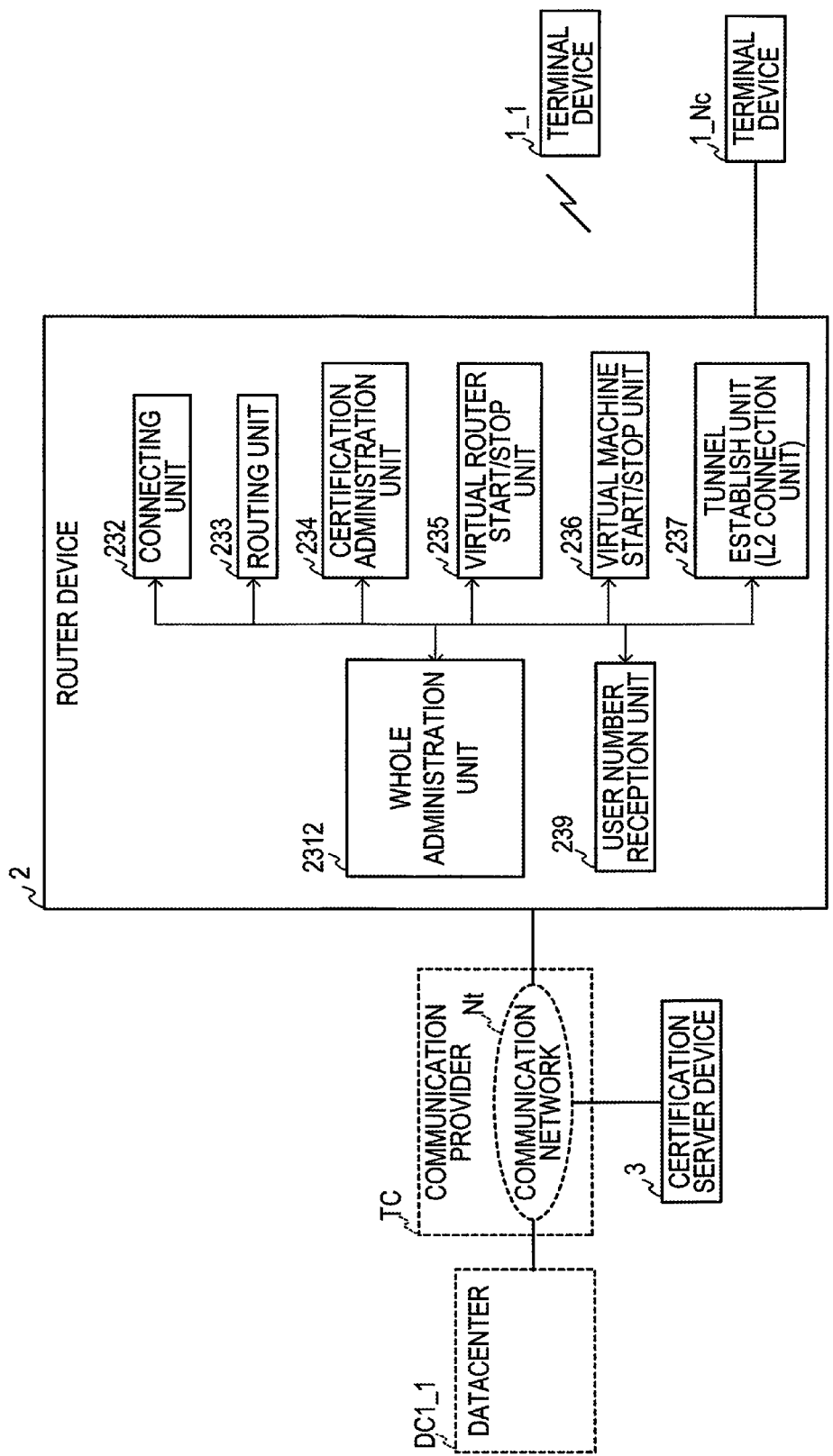
FIG. 21 is a block diagram of the software module which the router device according to the third embodiment executes.

FIG. 21 is a block diagram of the software module where the router device according to the third embodiment executes. In FIG. 21, the router device 2 is added a user number reception unit 239, which receives the number of the users who use the cloud service, from the certification server device 3 to the router device 2 in FIG. 4.

The whole administration unit 2312 administrates the user number reception unit 239 in addition to a function of the whole administration unit 231 which is illustrated by FIG. 4. Furthermore, the whole administration unit 2312, based on the number of the users in which the user number reception unit 239 received, determines whether or not the start of the virtual router and the virtual machine and the establishment of L2 tunnel are executed. In addition, the whole administration unit 2312 determines whether or not the stop process of the executing virtual router, the virtual machine and the L2 tunnel are executed.

Figure 22:
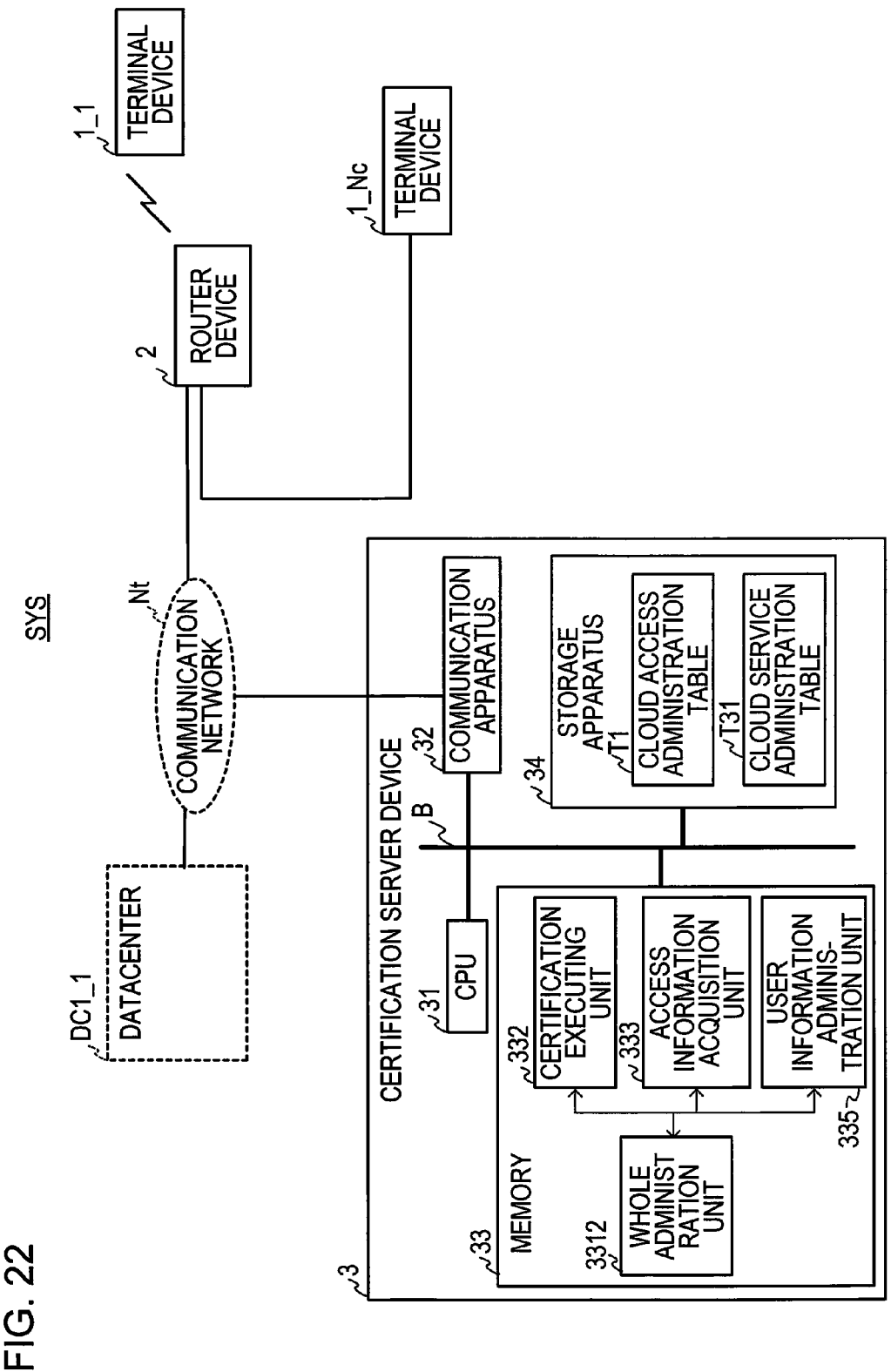
FIG. 22 is a hardware block diagram of the certification server device according to the third embodiment.

FIG. 22 is a hardware block diagram of the certification server device according to the third embodiment.

In FIG. 22, the certification server device 3 is added user information administration unit 335, which administrates the information about the user who used the cloud service, to the certification server device 3 in FIG. 5. The information about the user is the number of users who really use the cloud service, the ID of the first user who used the cloud service first, and the state of the cloud service. This certification server device 3 is one example of the second device which stores the number of users who really use the cloud service (called as the number of the users appropriately as follows).

The whole administration unit 3312 administrates the user information administration unit 335 in addition to a function of the whole administration unit 331 in FIG. 5. In addition, the storage apparatus 34 stores the cloud service administration table T31.

FIG. 23 is a diagram indicating an example of the cloud service administration table T31. The cloud service administration table T31 is newly added a SaaS state column, a number of the users column and the first user ID column to the cloud service administration table T2 in FIG. 7.

The SaaS state column stores the state of the cloud service (virtual machine) which is distinguished by the SaaS ID stored in the SaaS ID column. The number of the user column stores the number of the users who really use this cloud service. The first user ID column stores the first user ID which distinguishes a user using this cloud service first. This first user ID is the needed information for the stop process of the virtual machine and the virtual router, which is explained by FIG. 25.

In FIG. 23, the SaaS state column stores "start", "stop" as a state of the cloud service corresponding to each of above SaaS ID, and the number of the users column stores "Count-0", "Count-1" as the cloud service corresponding to each of above SaaS ID. This "Count-0", "Count-1" means an integer. In addition, the initial value of the "Count-0", "Count-1" is "0". Furthermore, the first user ID column stores the "User-A" as the user ID which uses the cloud service corresponding to each of above SaaS ID. In addition, as for the initial state, this column is a blank.

(The Flow of the Start of the Virtual Router, the Virtual Machine, the Flow of the Tunnel Establishment Processing)

The flow of the start of the virtual router, the virtual machine, the flow of the tunnel establishment processing according to the third embodiment will be explained based on FIG. 24 with reference to FIG. 6, FIG. 21-FIG. 23.

Figure 24:
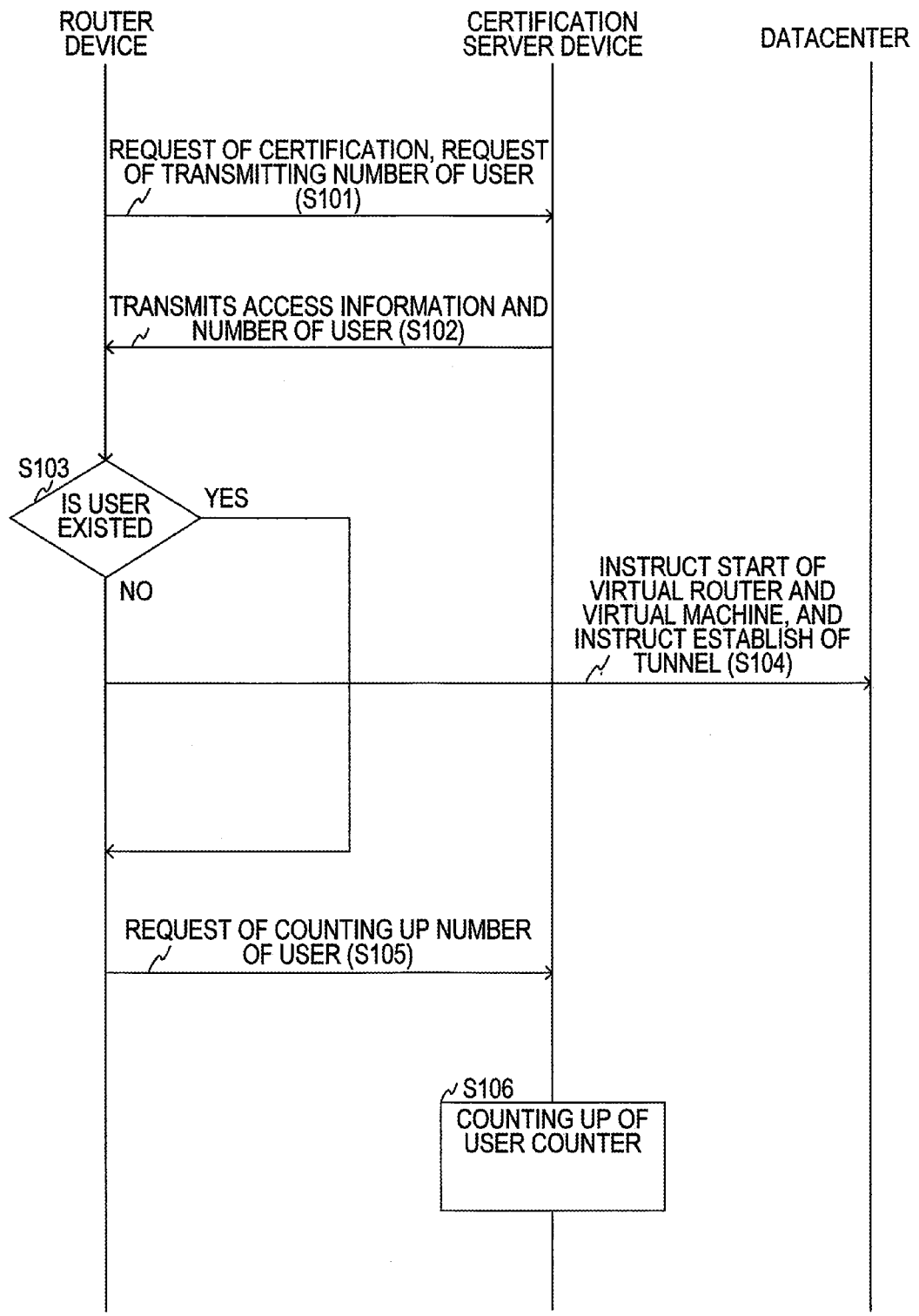
FIG. 24 is a diagram explaining the flow of the start of the virtual router, the virtual machine, the flow of the tunnel establishment processing according to the third embodiment.

FIG. 24 is a diagram explaining the flow of the start of the virtual router, the virtual machine, the flow of the tunnel establishment processing according to the third embodiment. FIG. 24 illustrates a flow after the process of the step S21-step S24 in FIG. 13 are executed.

Step S101: The certification administration unit 234 in FIG. 21 receives the certification information sent from the terminal device 1 and requests the certification request to the certification server device 3. Furthermore, the user number reception unit 239 requests a transmission request of the number of the users of the cloud service corresponding to the user ID included in this certification information to the certification server device 3 in FIG. 22.

Step S102: The certification server device 3 executes the certification processing based on the certification information which is received, and transmits the cloud access information corresponding to this certification information to the router device 2 in response to the certification request. Furthermore, the user information administration unit 335 in the server device 3, in response to a transmission request of the number of the users, acquires the number of the users of the cloud service corresponding to the user ID included in this certification information from the cloud service administration table T31 in FIG. 23, and transmits it to the router device 2. The explanation of the processing to transmit cloud access information to router device 2 is omitted, because explained it in the step S26 in FIG. 13. The user information administration unit 335, by processing to explain below, acquires the number of the users, and transmits it to the router device 2. At first, the whole administration unit 3312, when receiving a transmission request of the number of the users transmitted from the router device 2, instructs the user information administration unit 335 to execute the acquisition processing of the number of the users and the transmission processing. The user information administration unit 335, in response to the instruction, acquires the number of the users corresponding to the user ID, which is included in the certification information that the whole administration unit 3312 received, from the cloud service administration table T31 in FIG. 23.

The user information administration unit 335, when the SaaS state is "stop", changes the SaaS state of SaaS ID which distinguishes the cloud service corresponding to this user ID to "start" and stores this user ID in the user ID column of the first time of SaaS ID distinguishing the cloud service corresponding to this user ID.

In the case of the example explained in FIG. 13, the user ID was the "User-A". In this case, according to cloud access administration table T1 in FIG. 6, the SaaS ID distinguishing the cloud service corresponding to the user ID "User-A" is "SaaS-0". And, according to cloud service administration table T31 in FIG. 23, the number of the users corresponding to this SaaSID "SaaS-0" is "Count-0" (the initial value is "0"). In this way, the user information administration unit 335 acquires the number of the users corresponding to the user ID based on the cloud access administration table T1 in FIG. 6 and the cloud service administration table T31 in FIG. 23. The user information administration unit 335 transmits this number of users which is acquired to the router device 2. And the user information administration unit 335 changes the SaaS state column of the SaaSID "SaaS-0" to "start" from "stop" and stores "User-A" in the user ID column of the SaaSID "SaaS-0".

Step S103: The whole administration unit 2312 in the router device 2 in FIG. 21 receives the cloud access information, the number of the users of the cloud service corresponding to the certification information, and determines whether or not the user of this cloud service exists based on the number of users which is received. When the whole administration unit 2312 determines that there is not the user of the cloud service (No/S103), the process moves to step S104. When the whole administration unit 2312 determines that there is the user of the cloud service (YES/S103), the whole administration unit 2312 omits the processing of the step S104, and moves to step S105.

Specifically, the whole administration unit 2312 determines whether or not the number of the users of the cloud service is "0". When the number of the users is "0", it is determined that there is no user of the cloud service (No/S103) and the process moves to step S104. When the number of the users is not "0", it is determined that there is the user of the cloud service (YES/step S103) and the whole administration unit 2312 omits the processing of step S104 and moves to step S105.

Step S104: The router device 2 executes the start request process of the virtual router which is explained in the step S27, the start request process of the virtual machine which is explained in the step S29, and the L2 tunnel establishment processing which is explained in the step S31 in FIG. 13. In addition, the explanations in each of above steps S27, S29 and S31 are omitted, because the processes were already explained by FIG. 13. After the completion of the step S104, the process move to step S105.

Step S105: The whole administration unit 2312 in the router device 2 in FIG. 21 performs an update request of the number of the users of the cloud service corresponding to the user ID included in the certification information which is received, here a count up request, to the certification server device 3 in FIG. 22.

Step S106: The certification server device 3, when receiving this count up request, in response to this count up request, updates, for example, increase (count up) by one, the number of the users of the cloud service corresponding to this user ID. Specifically, when the whole administration unit 3312 in the certification server device 3 receives this count up request, the whole administration unit 3312 instructs the user information administration unit 335 to count up the number of the users of the cloud service corresponding to this user ID. The user information administration unit 3351 count up the number of the users of the cloud service corresponding to this user ID, in response to the instruction, and stores it in the number of the users column in the cloud service administration table T31 in FIG. 23.

In the above example, the user information administration unit 335 count up "Count-0" ("0") of the cloud service "SaaS-0" corresponding to the user ID "User-A" in "Count-0" ("1") in the cloud service administration table T31 in FIG. 23.

While, the user C distinguished by the user ID "User-C" inputs the certification information of the user C into the terminal device 1_Nb after the process in this step S106 was finished, for example. In this case, the processes of step S21-step S24 in FIG. 13 are executed, and subsequently the process move to the processing of step S101 in FIG. 24, and the processing of step S102 is executed.

In this case, according to the cloud access administration table T1 in FIG. 6, the SaaS ID corresponding to the user ID "User-C" is "SaaS-0". And, according to the cloud service administration table T31 in FIG. 23, the number of the users corresponding to this SaaS ID"SaaS-0" is "Count-0" ("1") (referring to above step S106). Therefore, the user information administration unit 335 in the certification server device 3 transmits this user number ("1") which is acquired to the router device 2 (step S102). The whole administration unit 2312 in the router device 2 in FIG. 21 receives the number of the users, and determines whether or not the number of the users is "0". The whole administration unit 2312 omits the process of step S104, since the number of the users is "1" (YES/step S103). Then, the process moves to the step S105. In addition, in the step 105, the "Count-0" ("1") is counted up to the "Count-0" ("2").

In addition, the whole administration unit 2312 in the router device 2 in FIG. 21 notifies the IP address of the virtual machine of the cloud service of the user C to the terminal device 1_Nb where the user C uses, with process of step S105. Afterward, the whole administration unit 2312 does not filter the packet to the virtual machine which has already started, in which the terminal device 1_Nb where the user C uses transmits, and transmits the packet to this virtual machine. In other words, the router device 2 admits the communication with the virtual machine (software) through the tunnel established in step S104, to the terminal device 1_Nb of the user C.

The stop of virtual router, the stop of the virtual machine, and a flow of the tunnel stop processing according to the third embodiment will be explained based on FIG. 25 with reference to FIG. 6, FIG. 21-FIG. 23.

Figure 25:
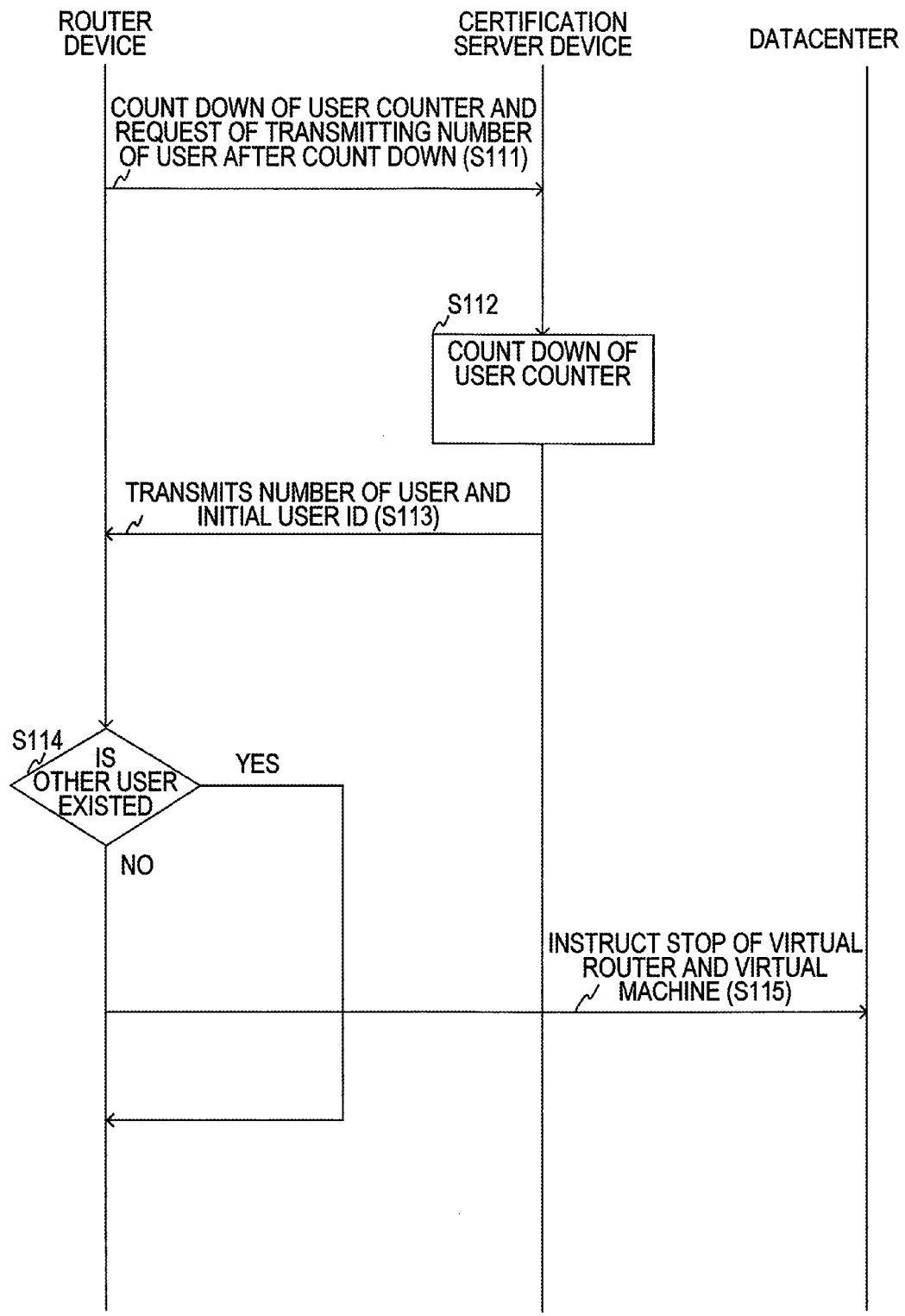
FIG. 25 is a diagram explaining the stop of the virtual router, the stop of the virtual machine, the flow of the tunnel stop processing according to the third embodiment.

FIG. 25 is a diagram explaining the stop of the virtual router, the stop of the virtual machine, the flow of the tunnel stop processing according to the third embodiment. In the explanation in FIG. 25, the processes of each of the steps in FIG. 24 are finished. In the example in FIG. 24, the cloud service corresponding to the user IDs "User-A" and "User-C" is starting.

Here, as explained by the first embodiment, an user distinguished by the user ID "User-A" operates the operation device 131 in the terminal device 1 in FIG. 2 and operates the stop instruction of the cloud service. In this time, the user together inputs the certification information which authenticates the user of this cloud service. This certification information has the user ID of this user as having illustrated by the first embodiment.

The operation control apparatus 13 transmits the command indicating that the stop instruction operation having been executed to the whole administration unit 1611 in response to this stop instruction operation. The whole administration unit 1611, when receiving this command, transmits the ID ("User-A") of this user to the router device 2 in FIG. 21 and transmits the second command to instruct the stop of the cloud service to the router device 2 in FIG. 21.

Step S111: When the whole administration unit 2312 in the router device 2 receives this user ID and the stop request of the cloud service, the whole administration unit 2312 performs a countdown request of the number of the users of the cloud service corresponding to this user ID and a transmission request of the number of the users after the countdown to the certification server device 3 in FIG. 22. Furthermore, the whole administration unit 2312 requests the transmission request of the first user ID of the SaaS ID corresponding to this user ID to the certification server device 3.

Step S112: The certification server device 3 performs the countdown of the number of the users of the cloud service corresponding to the user ID which is received. Specifically, when the whole administration unit 3312 receives the above countdown request and the transmission request, the whole administration unit 3312 performs the following instructions to the user information administration unit 335. These instructions are the countdown processing of the number of the users corresponding to SaaS ID distinguishing the cloud service corresponding to the user ID, the transmission processing of the number of the users after the countdown, and the transmission processing of the first time user ID corresponding to this SaaS ID.

The user information administration unit 335 acquires the number of the users corresponding to the user ID of which the whole administration unit 3312 received, from the cloud service administration table T31 in FIG. 23, and decreases (countdown) the number of the users by one, in response to these instructions.

In the case of the above example, the user ID was "User-A". In this case, according to the cloud access administration table T1 in FIG. 6, the SaaS ID distinguishing the cloud service corresponding to the user ID "User-A" is "SaaS-0". And, according to the cloud service administration table T31 in FIG. 23, the number of the users corresponding to this SaaS ID "SaaS-0" is "Count-0" ("2"). The user information administration unit 335 countdowns the number of these users and makes the "Count-0" ("1"). In addition, the first user ID corresponding to this SaaS ID "SaaS-0" is "User-A".

Step S113: The user information administration unit 335 transmits the number of users after the countdown and the first user ID to the router device 2. In the case of the above example, the user information administration unit 335 transmits this "Count-0" ("1") and "User-A" to the router device 2.

Step S114: The whole administration unit 2312 in the router device 2 in FIG. 21 receives the number of the users of the cloud service and the first user ID, and determines whether or not other user of this cloud service exist based on the number of the users. When the whole administration unit 2312 determines that there is the other user (YES/step S114), the whole administration unit 2312 finishes processing. When the whole administration unit 2312 determines that there is not the other user (NO/step S114), the whole administration unit 2312 moves to step S115. Specifically, the whole administration unit 2312 determines whether the number of the users of the cloud service is "0". When it is determined that the number of the users is not "0", the whole administration unit 2312 determines that there is the other user of the cloud service (YES/step S114), and finishes processing. In the case that it is determined that the number of user is "0", the whole administration 2312 unit determines that there is not the other user of the cloud service (NO/step S114) and moves to step S115.

In the case of the above example, because the whole administration unit 2312 has received "Count-0" ("1") for the number of the users, that is, the number of user is not"0" (YES/S114), the whole administration unit 2312 finishes processing.

After this processing, the user distinguished by the user ID "User-C" operates the operation device 131 of the terminal device 1_Nb in FIG. 1 and operates the stop instruction of the cloud service. Then, as described above, the operation control apparatus 13 transmits the command indicating that the stop instruction operation was executed to the whole administration unit 161 in response to this stop instruction operation. When the whole administration unit 161 receives this command, the whole administration unit 161 transmits the ID ("User-C") of this user to the router device 2 in FIG. 21 and the second command to instruct the stop of the cloud service to the router device 2.

And above steps S111, S112 in FIG. 25 are executed. In this step S112, the user information administration unit 335 countdowns the number of the users of user ID "User-C" corresponding to the user ID "User-C" to make "Count-0" ("0").

Afterward, the processes of the step S113 and the step S114 are executed. In this step S114, the whole administration unit 2312 in the router device 2 in FIG. 21 receives the number of the users ("0") and the user ID "User-A" and determines whether or not the number of the users is "0". In the case of the above example, because the number of the users is 0 (NO/step S114), the process moves to step S115.

Step S115: The router device 2 in FIG. 4 executes the stop instruction of the virtual router and the virtual machine corresponding to the first user ID which is received.

Specifically, the whole administration unit 231 instructs the virtual machine start/stop unit 236 to execute the stop process of the virtual machine corresponding to the first user ID. The virtual machine start/stop unit 236 searches the API which is the start/stop information of the virtual machine corresponding to this first user ID, in response to the instruction, from the storage apparatus 24 (referring to FIG. 3). In addition, as described in the step S27 in FIG. 13, the storage apparatus 24 stores the start/stop information (API) of the virtual router corresponding to the user ID, the start/stop information (API) of the virtual machine corresponding to the SaaS ID corresponding to this user ID.

And the virtual machine start/stop unit 236 sets the first user ID and the stop instruction option as an argument in the API and executes the API which is the start/stop information of this virtual machine.

In the above example, the virtual machine start/stop unit 236 sets this first user ID"User-A" and the stop instruction option as an argument in the API_VM-A and executes the API_VM-A which is the start/stop information of the virtual machine. In addition, more description about the stop process of the virtual machine is omitted, because the explanation was described in the first embodiment.

Then, the whole administration unit 231 instructs the virtual router start/stop unit 235 to execute the stop process of the virtual router corresponding to the first user ID. The virtual router start/stop unit 235 searches the API which is the start/stop information of the virtual router corresponding to this first user ID, in response to the instruction, from the storage apparatus 24 (FIG. 3).

And the virtual router start/stop unit 235 sets the first user ID and the stop instruction option as an argument in the API and executes the API which is the start/stop information of this virtual router.

In the above example, the virtual router start/stop unit 235 sets this first user ID "User-A" and the stop instruction option as an argument in the API_VR-A and executes the API_VR-A which is the start/stop information of the virtual router. In addition, more description about the stop process of the virtual router is omitted, because the explanation is described with the first embodiment.

When the stop process of this virtual router is finished, the tunnel establishment unit 237 in the router device 2 stops the encapsulation processing in the tunnel which is established, namely executes the stop processing of the tunnel.

According to the embodiment, when a plurality of users use single cloud service (virtual machine) at the same time, the router device does not execute the start processing of the virtual machine anymore, since the cloud service already started. Therefore, it is possible to omit the start process of the virtual machine and to suppress increase of the processing loads of the router device 2 and the administration server device 7. In addition, when a certain cloud service is stopped, this cloud service is not stopped when the other user uses this cloud service.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
a first device which performs information processing service by executing software;
a second device which authenticates a user of the information processing system and stores first information to start the software and second information to establish a virtual communication network which communicates with the software via the network, which are defined for each of a plurality of users;
a third device which stores third information to connect to the second device; and
a communication device which controls communication via the network between the first device and a terminal device of the user,
wherein the communication device receives certification information to authenticate the user of the information processing service from the terminal device and to request certification of the user to the second device, and issues a request of transmission of the third information to the third device,
wherein the second device authenticates the user, and transmits the first information and the second information, which are defined for each of the users of the information processing service, to the communication device, when the authentication of the user succeeds, and the communication device receives the first information and the second information, and transmits a first command to instruct a start of the software based on the first information which is received to the first device,
wherein the third device transmits the third information to the communication device in response to the request of transmission, and the communication device receives the third information from the third device, connects to the second device based on the third information which is received, and receives the first information and the second information from the second device, and
wherein the first device receives the first command, starts and executes the software, and the communication device establishes the virtual communication path in the network based on the second information which is received.

2. The information processing system according to claim 1, wherein the second device stores a number of users of the information processing service, and
the communication device receives certification information to authenticate the user of the information processing service from the terminal device, receives the number of users of the information processing service corresponding to the certification information from the second device, determines whether or not there is an existing user of the information processing service based on the number of users which is received, transmits the first command and establishes the virtual communication path for communicating with the software when there is not the existing user of the information processing service, and admits the communication with the software through the virtual communication path which is established to the terminal device when there is the existing user of the information processing service, and requests update of the number of users of the information processing service to the second device, and
the second device updates the number of users of the information processing service in response to the request of update.

3. The information processing system according to claim 2, wherein the communication device receives certification information to authenticate the user of the information processing service, and a second command to instruct a stop of the information processing service from the terminal device, receives the number of users of the information processing service corresponding to the certification information from the second device, determines whether or not there is another user of the information processing service based on the number of users which is received, and transmits a third command to instruct the stop of the information processing service to the first device when there is not the other user of the information processing service.

4. The information processing system according to claim 1, wherein the software comprises a virtual machine and a virtual router which controls communication processing of the virtual machine, and
the communication device establishes the virtual communication path for communicating with the virtual router.

5. The information processing system according to claim 1, wherein the first device comprises:
a service execution device which performs the information processing service by executing the software; and
an administration device which administrates the service execution device, and
wherein the communication device transmits the first command to the administration device, and
the administration device receives the first command, and transmits a fourth command to instruct a start of the software to the service execution device, and the service execution device receives the fourth command and starts and executes the software.

6. An information processing method in an information processing system including a first device which performs information processing service by executing software, a second device which authenticates a user of the information processing system and stores first information to start the software and second information to establish a virtual communication network which communicates with the software via the network, which are defined for each of a plurality of users, and a communication device which controls communication via the network between the first device and a terminal device of the user, wherein the information processing method comprising:

receiving certification information to authenticate the user of the information processing service from the terminal device and requesting certification of the user to the second device by the communication device;

authenticating the user, and transmitting the first information and the second information, which are defined for each of the users of the information processing service, to the communication device, when the authentication of the user succeeds, by the second device;

sending a request of transmission of third information to connect to the second device from the communication device to a third device which stores the third information;

transmitting the third information from the third device to the communication device in response to the request of transmission;

receiving the third information from the third device and connecting to the second device based on the third information which is received, by the communication device;

receiving the first information and the second information from the second device, and transmitting to the first device a first command to instruct a start of the software based on the first information which is received, by the communication device;

receiving the first command, and starting and executing the software by the first device; and establishing the virtual communication path in the network based on the second information which is received by the communication device.

7. The information processing method according to claim 6, further comprising:

receiving certification information to authenticate the user of the information processing service from the terminal device, and receiving a number of users of the information processing service corresponding to the certification information from the second device which stores the number of users of the information processing service, by the communication device;

determining whether or not there is an existing user of the information processing service based on the number of users which is received by the communication device;

transmitting the first command and establishing the virtual communication path for communicating with the software when there is not the existing user of the information processing service by the communication device;

admitting the communication with the software through the virtual communication path which is established to the terminal device when there is the existing user of the information processing service by the communication device;

requesting update of the number of users of the information processing service to the second device by the communication device; and updating the number of users of the information processing service in response to the request of update by the second device.

8. The information processing method according to claim 7, wherein the information processing method further comprising:

receiving certification information to authenticate the user of the information processing service, and a second command to instruct a stop of the information processing service from the terminal device by the communication device;

receiving the number of users of the information processing service corresponding to the certification information from the second device by the communication device;

determining whether or not there is another user of the information processing service based on the number of users which is received by the communication device; and transmitting a third command to instruct the stop of the information processing service to the first device when there is not the other user of the information processing service by the communication device.

9. The information processing method according to claim 6, wherein the establishing comprising establishing the virtual communication path for communicating with the software which comprises a virtual machine and a virtual router which controls communication processing of the virtual machine by the communication device.

10. The information processing method according to claim 6, wherein the information processing method further comprising:

transmitting the first command to an administration device, which administrates a service execution device which performs the information processing service by executing the software, in the first device, by the communication device;

receiving the first command, and transmitting a fourth command to instruct a start of the software to the service execution device by the administration device; and receiving the fourth command and starting and executing the software by the service execution device.

11. A communication device which controls communication via a network between a first device which performs information processing service by executing software and a terminal device of a user, the communication device comprising:

a communication unit; and a hardware processor which receives certification information to authenticate the user of the information processing service from the terminal device, requests authentication by a second device, which authenticates the user of the information processing system and stores first information to start the software and second information to establish a virtual communication network which communicates with the software via the network, which are defined for each of a plurality of users, sends a request of transmission of third information to connect to the second device to a third device which stores the third information, receives the third information sent from the third device in response to the request of transmission, connects to the second device based on the third information which is received, receives the first information and the second information, which are defined for each of the plurality of users, which are sent from the second device when the authentication of the user is a success, transmits a first command to instruct a start of the software based on the first information which is received to the first device, and establishes the virtual communication path in the network based on the second information which is received.

12. The communication device according to claim 11, wherein the control unit receives certification information to authenticate the user of the information processing service from the terminal device, receives a number of users of the information processing service corresponding to the certification information from the second device which stores the number of users of the information processing service, determines whether or not there is an existing user of the information processing service based on the number of users which is received, transmits the first command and establishes the virtual communication path for communicating with the software when there is not the existing user of the information processing service, admits the communication with the software through the virtual communication path which is established to the terminal device when there is the existing user of the information processing service, and requests update of the number of users of the information processing service by the second device.

13. The communication device according to claim 12, wherein the control unit receives certification information to authenticate the user of the information processing service, and a second command to instruct a stop of the information processing service from the terminal device, receives the number of users of the information processing service corresponding to the certification information from the second device, determines whether or not there is another user of the information processing service based on the number of users which is received, and transmits a third command to instruct the stop of the information processing service to the first device when there is not the other user of the information processing service.

14. The communication device according to claim 11, wherein the control unit device establishes the virtual communication path for communicating with the software which comprises a virtual machine and a virtual router which controls communication processing of the virtual machine.

* * * * *